(12) United States Patent
Liu et al.

(10) Patent No.: US 11,393,213 B2
(45) Date of Patent: Jul. 19, 2022

(54) TRACKING PERSONS IN AN AUTOMATED-CHECKOUT STORE

(71) Applicant: AiFi Inc., Santa Clara, CA (US)

(72) Inventors: Shuang Liu, Stanford, CA (US); Long Chen, Santa Clara, CA (US); Wangpeng An, Santa Clara, CA (US); Zijie Zhuang, Santa Clara, CA (US); Ying He, Santa Clara, CA (US); Ying Zheng, San Jose, CA (US); Steve Gu, San Jose, CA (US)

(73) Assignee: AIFI INC., Santa Clara, CA (US)

( * ) Notice: Subject to any disclaimer, the term of this patent is extended or adjusted under 35 U.S.C. 154(b) by 425 days.

(21) Appl. No.: 16/508,678

(22) Filed: Jul. 11, 2019

(65) Prior Publication Data

US 2020/0184230 A1 Jun. 11, 2020

Related U.S. Application Data

(63) Continuation-in-part of application No. 16/374,692, filed on Apr. 3, 2019.
(Continued)

(51) Int. Cl.
*G06T 7/292* (2017.01)
*G06T 7/70* (2017.01)
(Continued)

(52) U.S. Cl.
CPC .............. *G06V 20/53* (2022.01); *G06F 17/18* (2013.01); *G06T 7/292* (2017.01); *G06T 7/70* (2017.01); *G06V 40/173* (2022.01); *G06V 40/23* (2022.01)

(58) Field of Classification Search
None
See application file for complete search history.

(56) References Cited

U.S. PATENT DOCUMENTS

| 8,010,402 B1 | 8/2011 | Sharma et al. |
| 9,704,155 B2 | 7/2017 | McCullagh et al. |
(Continued)

FOREIGN PATENT DOCUMENTS

| WO | 2018/014109 A1 | 1/2018 |
| WO | 2018/067429 A1 | 4/2018 |
| WO | 2018165173 A1 | 9/2018 |

OTHER PUBLICATIONS

PCT International Search Report and the Written Opinion dated Jan. 31, 2020, issued in related International Application No. PCT/US2019/062487 (8 pages).
(Continued)

*Primary Examiner* — Bernard Krasnic
(74) *Attorney, Agent, or Firm* — Sheppard Mullin Richter & Hampton LLP

(57) ABSTRACT

Methods, systems, and apparatus, including computer programs encoded on computer storage media, for tracking a product item in an automated-checkout store. One of the methods includes receiving, by a computer system, data collected by multiple image sensors, the received data including data associated with a person, identifying, by the computer system based on the received data, multiple features of the person, extracting, by the computer system based on the identified features, data associated with the person from the received data, wherein the extracted data correspond to multiple time periods, and determining, by the computer system, a location of the person in each of the time periods based on the extracted data corresponding to the time period, wherein the determining includes aggregating the extracted data collected by different image sensors based at least in part on a location and a line of sight of each of the image sensors.

20 Claims, 13 Drawing Sheets

Related U.S. Application Data

(60) Provisional application No. 62/775,840, filed on Dec. 5, 2018, provisional application No. 62/775,844, filed on Dec. 5, 2018, provisional application No. 62/775,837, filed on Dec. 5, 2018, provisional application No. 62/775,857, filed on Dec. 5, 2018, provisional application No. 62/775,846, filed on Dec. 5, 2018.

(51) Int. Cl.
*G06V 20/52* (2022.01)
*G06F 17/18* (2006.01)
*G06V 40/20* (2022.01)
*G06V 40/16* (2022.01)

(56) References Cited

U.S. PATENT DOCUMENTS

| | | | |
|---|---|---|---|
| 9,911,290 B1 | 3/2018 | Zalewski et al. | |
| 10,019,654 B1 | 7/2018 | Pisoni | |
| 10,237,058 B2 | 3/2019 | Aihara et al. | |
| 10,242,501 B1 | 3/2019 | Pusch et al. | |
| 10,282,720 B1 | 5/2019 | Buibas et al. | |
| 10,310,597 B2 | 6/2019 | Biedert et al. | |
| 10,373,322 B1* | 8/2019 | Buibas | G06K 9/00201 |
| 2007/0183633 A1 | 8/2007 | Hoffman | |
| 2008/0243702 A1 | 10/2008 | Hart et al. | |
| 2012/0169879 A1 | 7/2012 | Libal et al. | |
| 2014/0358639 A1* | 12/2014 | Takemoto | G06K 9/00335 |
| | | | 705/7.33 |
| 2015/0023562 A1 | 1/2015 | Moshfeghi | |
| 2016/0285793 A1 | 9/2016 | Anderson et al. | |
| 2017/0220855 A1 | 8/2017 | Bose et al. | |
| 2017/0256148 A1 | 9/2017 | King et al. | |
| 2018/0039745 A1* | 2/2018 | Chevalier | G16H 30/20 |
| 2018/0096566 A1 | 4/2018 | Blair, II et al. | |
| 2018/0343432 A1 | 11/2018 | Duan et al. | |
| 2018/0373928 A1 | 12/2018 | Glaser et al. | |
| 2019/0121224 A1 | 4/2019 | Edwards et al. | |
| 2020/0019914 A1 | 1/2020 | Brosnan et al. | |
| 2020/0034807 A1 | 1/2020 | Shamai et al. | |

OTHER PUBLICATIONS

PCT International Search Report and the Written Opinion dated Feb. 6, 2020, issued in related International Application No. PCT/US2019/062490 (14 pages).

* cited by examiner

TRACKING PERSONS IN AN AUTOMATED-CHECKOUT STORE

CROSS REFERENCE TO RELATED APPLICATION

This application is a continuation-in-part under 35 U.S.C. § 120 of U.S. patent application Ser. No. 16/374,692, filed Apr. 3, 2019. This application also claims the benefit of U.S. Provisional Patent Application No. 62/775,837, filed on Dec. 5, 2018, U.S. Provisional Patent Application No. 62/775,840, filed on Dec. 5, 2018, U.S. Provisional Patent Application No. 62/775,846, filed on Dec. 5, 2018, U.S. Provisional Patent Application No. 62/775,844, filed on Dec. 5, 2018, and U.S. Provisional Patent Application No. 62/775,857, filed on Dec. 5, 2018. The entirety of the aforementioned applications is incorporated herein by reference.

TECHNICAL FIELD

The disclosure relates generally to tracking persons in an automated-checkout store.

BACKGROUND

Shopping environments may range in size from 100-square-feet mom-and-pop stores to 200,000-square-feet warehouse style grocery stores or outlets. A retail environment may provide for sale a variety of products and serve a variety of customers. Inventory management and customer service provided in the retail environment may often be labor-intensive. For example, employees are often charged with responsibilities such as checking inventory, replenishing products that are sold out, finding and organizing misplaced products, and checking out customers. Particular tasks for managing a retail environment may also be time-consuming for customers. For example, lines may often be formed in front of checkout counters, in which customers may wait for a cashier to scan individual product items and take payment information from other customers. Using employees to perform these tasks may also cause human errors, such as charging for wrong product items. These human errors may result in further delays, inconveniences, and costs. The computer systems for managing different divisions (e.g., checkout, inventory, security) of the retail environment may often be separated and independent from each other. Such computer systems may be inefficient in communicating and coordinating with each other, particularly when solving problems that may require information from different divisions.

SUMMARY

Various embodiments of the present disclosure can include systems, methods, and non-transitory computer readable media for tracking a person, such as a customer, in an automated-checkout store.

According to one aspect, a person-tracking method may include receiving, by a computer system, data collected by a plurality of image sensors. The received data may comprise data associated with a person. The method may also include identifying, by the computer system based on the received data, a plurality of features of the person and extracting, by the computer system based on the identified features, data associated with the person from the received data. The extracted data may correspond to a plurality of time periods. The method may further include determining, by the computer system, a location of the person in each of the time periods based on the extracted data corresponding to the time period. The determining may comprise aggregating the extracted data collected by different image sensors based at least in part on a location and a line of sight of each of the image sensors.

In some embodiments, the identifying may comprise assigning an identifier to the person. The identifying may further comprise storing the features of the person in association with the identifier.

In some embodiments, the extracting may comprise, for one of the time periods, determining a location of the person in a preceding time period. The extracting may further comprise identifying one or more of the image sensors each having a field of view that encompasses the determined location. The extracting may further comprise obtaining data collected by the identified image sensors that correspond to the time period.

In some embodiments, the method may further comprise, determining a movement path of the person based on the location of the person in each of the time periods. The method may further comprise determining that the person exits the field of view of one or more of the identified image sensors and enters the field of view of one or more other image sensors. The method may further comprise determining a location of the person in a subsequent time period based at least in part on data collected by the one or more other image sensors.

In some embodiments, the method may further comprise, for one of the time periods, detecting a failure of locating the person in a preceding time period. The method may further comprise extracting data associated with the person from the received data that correspond to the one of the time periods based on the identified features of the person. The method may further comprise identifying one or more of the image sensors that collected the extracted data. The method may further comprise determining the location of the person based on data collected by the identified image sensors.

In some embodiments, the extracted data comprises a plurality of images captured by the image sensors. The aggregating the extracted data may comprise identifying one or more pixels corresponding to the person in each of the images. The aggregating the extracted data may comprise determining a plurality of lines in a three-dimensional space. Each of the lines may be determined based on a position of one of the identified pixels in the image containing the pixel and the line of sight of the image sensor capturing the image. The aggregating the extracted data may comprise determining one or more intersection areas of the lines.

In some embodiments, the plurality of image sensors may correspond to a plurality of groups each comprising one or more of the image sensors. The aggregating the extracted data may comprise processing the data collected by each group of image sensors to obtain analysis results and aggregating the analysis results associated with the plurality of groups of image sensors.

In some embodiments, the determining the location of the person in each of the time periods may further comprise determining a plurality of possible locations of the person. Each of the possible locations of the person may be associated with a probability value. The determining the location may comprise selecting one of the possible locations as the location of the person based at least in part on the probability values.

In some embodiments, the determining the location of the person in each of the time periods may comprise determining a plurality of possible locations of the person. The determining the location of the person may comprise selecting one of the possible locations as the location of the person based at least in part on a previous movement path of the person.

In some embodiments, the determining the location of the person in each of the time periods may further comprise combining the extracted data with data collected by one or more vibration sensors.

Various aspects of the present disclosure provide a system for tracking a person in an automated-checkout store.

The system may comprise a computer system and a plurality of image sensors. The computer system may comprise one or more processors and one or more non-transitory computer-readable storage media storing instructions executable by the one or more processors to cause the system to perform operations. The operations may comprise receiving, by the computer system, data collected by the image sensors. The received data may comprise data associated with a person. The operations may comprise identifying, by the computer system based on the received data, a plurality of features of the person. The operations may comprise extracting, by the computer system based on the identified features, data associated with the person from the received data. The extracted data may correspond to a plurality of time periods. The operations may comprise determining, by the computer system, a location of the person in each of the time periods based on the extracted data corresponding to the time period. The determining the location of the person may comprise aggregating the extracted data collected by different image sensors based at least in part on a location and a line of sight of each of the image sensors.

In some embodiments, the identifying may comprise assigning an identifier to the person and storing the features of the person in association with the identifier.

In some embodiments, the extracting, by the computer system based on the identified features, may comprise, for one of the time periods, determining a location of the person in a preceding time period. The extracting may comprise identifying one or more of the image sensors each having a field of view that encompasses the determined location. The extracting may comprise obtaining data collected by the identified image sensors that correspond to the time period.

In some embodiments, the operations may further comprise determining a movement path of the person based on the location of the person in each of the time periods. The operations may further comprise determining that the person exits the field of view of one or more of the identified image sensors and enters the field of view of one or more other image sensors. The operations may further comprise determining a location of the person in a subsequent time period based at least in part on data collected by the one or more other image sensors.

In some embodiments, the operations may further comprise, for one of the time periods, detecting a failure of locating the person in a preceding time period. The operations may further comprise extracting data associated with the person from the received data that correspond to the one of the time periods based on the identified features of the person. The operations may further comprise identifying one or more of the image sensors that collected the extracted data. The operations may further comprise determining the location of the person based on data collected by the identified image sensors.

In some embodiments, the extracted data may comprise a plurality of images captured by the image sensors. The aggregating the extracted data may comprise identifying one or more pixels corresponding to the person in each of the images. The aggregating the extracted data may comprise determining a plurality of lines in a three-dimensional space. Each of the lines may be determined based on a position of one of the identified pixels in the image containing the pixel and the line of sight of the image sensor capturing the image. The aggregating the extracted data may comprise determining one or more intersection areas of the lines.

In some embodiments, the plurality of image sensors may correspond to a plurality of groups each comprising one or more of the image sensors. The aggregating the extracted data may comprise processing the data collected by each group of image sensors to obtain analysis results. The aggregating the extracted data may comprise aggregating the analysis results associated with the plurality of groups of image sensors.

In some embodiments, the determining the location of the person in each of the time periods may further comprise determining a plurality of possible locations of the person. Each location may be associated with a probability value. The determining the location of the person may comprise selecting one of the possible locations as the location of the person based at least in part on the probability values.

In some embodiments, the determining the location of the person in each of the time periods may further comprise determining a plurality of possible locations of the person. The determining the location of the person in each of the time periods may comprise selecting one of the possible locations as the location of the person based at least in part on a previous movement path of the person.

In some embodiments, the determining the location of the person in each of the time periods may further comprise combining the extracted data with data collected by one or more vibration sensors.

According to yet another aspect, a non-transitory computer-readable storage medium for tracking a product item in an automated-checkout store may be configured with instructions executable by one or more processors to cause the one or more processors to perform operations. The operations may comprise receiving, by the computer system, data collected by the image sensors. The received data may comprise data associated with a person. The operations may comprise identifying, by the computer system based on the received data, a plurality of features of the person. The operations may comprise extracting, by the computer system based on the identified features, data associated with the person from the received data. The extracted data may correspond to a plurality of time periods. The operations may comprise determining, by the computer system, a location of the person in each of the time periods based on the extracted data corresponding to the time period. The determining may comprise aggregating the extracted data collected by different image sensors based at least in part on a location and a line of sight of each of the image sensors.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
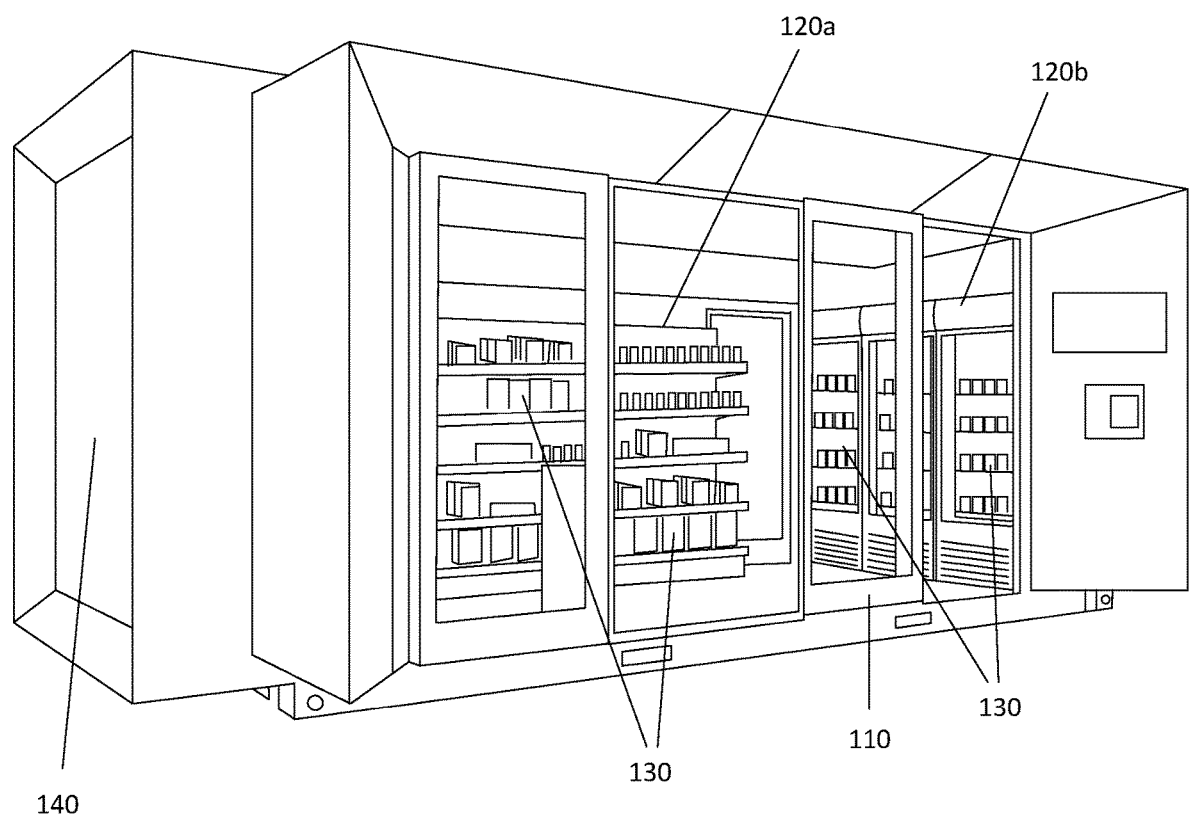
FIG. 1 illustrates an example setup of an automated-checkout store.

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In some embodiments, a store may provide automated checkout services to customers. Such an automated-checkout store may comprise a plurality of sensors that collect data from the environment, and particularly about product items, persons, and other objects, both immobile and movable, in the store. A computer system in the automated-checkout store may process the data collected by the sensors to recognize and track product items and objects, to identify and track persons, and to determine interactions between the persons and the product items and/or objects. Based on the sensor data, the computer system may determine a person's activities such as picking up a product item from a shelf, placing a product item back, dropping a product item in a shopping cart, or other activities of interest. The computer system may also determine the identities and prices of the product items interacted with by the person. In this manner, the computer system may automatically charge the person based on his or her purchase and generate an itemized receipt.

In some embodiments, a person entering such an automated-checkout store may provide identification information by, for example, swiping a payment card or identification card, scanning a quick response ("QR") code or a ticket. The person may then freely pick up product items on sale in the store. Based on data collected by sensors in the store, a computer system may automatically determine the activities of the person. After shopping, the person may directly walk out of the store, knowing that an appropriate payment will be automatically deducted from her account. Particular embodiments may reduce or eliminate the need for human labor for managing a retail environment, provide customers a quick and smooth shopping and checkout experience, and reduce a likelihood of mistakes that may be made by the retailer. Furthermore, particular embodiments use an integrated system to manage various aspects of the retail environment. Such a system may effectively coordinate various services and efficiently use or re-use information collected for different purposes. For example, a detected activity by a person of picking up a product item and placing it in a shopping cart may be used to determine an inventory level of the product item as well as to generate a bill for the customer. In this manner, the efficiency of computer systems used in retail environments may be improved.

In some embodiments, the automated-checkout system may be installed in a traditional retail environment by affixing sensors and computing systems in different areas of the environment. In other embodiments, the automated-checkout system may be implemented as a "Nano Store" or a walk-in vending machine, which may be a modular brick & mortar store that is built in with automated checkout technologies. The Nano Store or walk-in vending machine may be of a small and manageable size (e.g., 200 square feet). It may be built in with all the fixtures, sensors, and computer systems, so that the store will automatically monitor customer activities and provide automated checkout. It may be easily disassembled, re-assembled, and transported. Alternatively, it may be implemented within a unitary enclosure. The enclosure may be made mobile using, for example, wheels at the bottom. Robotic tools (e.g., robotic arms) may also be used in such a store to facilitate functions such as automatic stocking of product items.

In some embodiments, one or more vending machines may be attached to an external surface of an automated-checkout store. The vending machines provide for sale product items such as hot or cold drinks, food, tobacco products, other suitable product items, or any combination thereof. A customer may purchase product items from the vending machine using, for example, a credit card or a phone application. In some embodiments, one or more lockers may be attached to an external surface of an automated-checkout store. The lockers may be unlockable using passcodes. Packages for customers as well as product items bought from e-commerce websites may be placed in the lockers for the customers to pick up. As an example and not by way of limitation, after placing an order for a product item on an e-commerce website, a customer may receive an email indicating a locker that the product item is placed in and a passcode to open the locker. The customer may go to the automated-checkout store to pick up the product item. In some embodiments, the lockers may share a heating-cooling system associated with the automated-checkout store such that some of the lockers may be heated and some other lockers may be cooled. The different types of lockers may be color-coded to indicate their temperature (e.g., red for heated, blue for cooled, green for room-temperature ones). These temperature-controlled lockers may be suitable for products that require certain temperatures, such as hot dishes from a local restaurant or ice creams. In some embodiments, the automated-checkout store may be integrated with one or more other suitable devices (e.g., lottery machine).

FIG. 1 illustrates an example setup of an automated-checkout store 100. The automated-checkout store 100 may comprise a system for tracking a person in the store 100. In some embodiments, the automated-checkout store 100 may provide an enclosed environment. The store 100 may comprise one or more doors 110, and one or more shelves, such as 120a and 120b. The doors 110 may be hinged doors, revolving doors, sliding doors, or other suitable doors. In some embodiments, the store 100 may comprise two sets of doors 110 with a small space in between to prevent multiple people from entering the store at once, which may complicate tracking of the people. In some embodiments, the shelves 120 may hold product items 130 for selection and purchase by a customer. In some embodiments, the automated-checkout store 100 may comprise one or more outer surfaces 140 that may be used for a plurality of potential purposes (e.g., di splaying advertisements).

Figure 2:
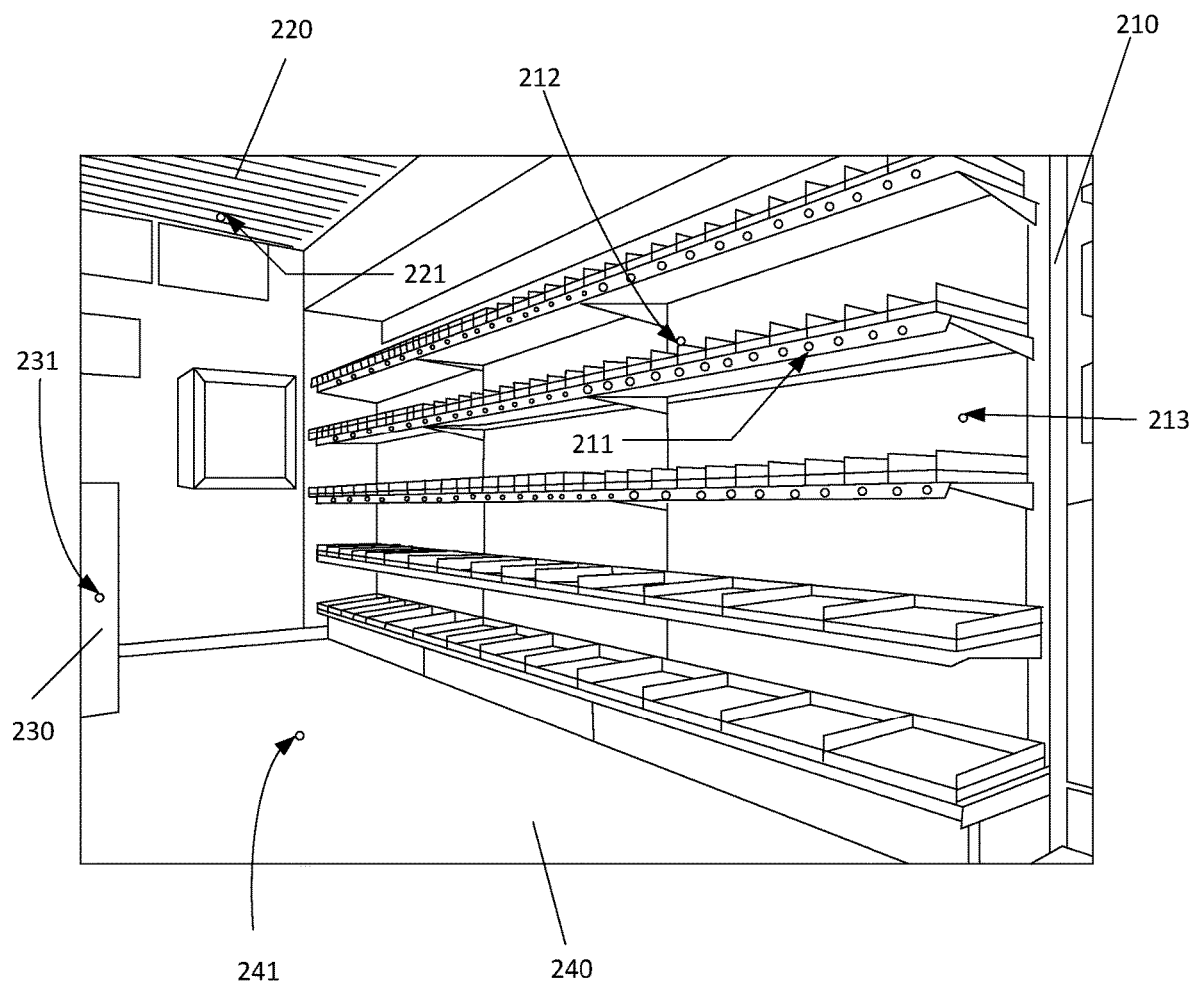
FIG. 2 illustrates example locations to place sensors in an automated-checkout store.

FIG. 2 illustrates example locations to place sensors in an automated-checkout store. In some embodiments, one or more sensors may be affixed to one or more structures in the automated-checkout store. The structures may comprise, for example, a ceiling, a floor, a shelf, a rack, a refrigerator, other suitable structures, or any combination thereof. Illustrated by FIG. 2 may be an inner space of an automated-checkout store. The automated-checkout store may comprise one or more shelves 210, a ceiling 220, one or more fixtures 230 (e.g., a peg), a floor 240. In order to collect data about product items and persons in the automated checkout store, a plurality of sensors may be placed in various locations in the indoor environment. For example, one or more sensors 211 may be affixed to the bottom of each shelf 210, one or more sensors 212 may be affixed above each shelf 210, and one or more sensors 213 may be affixed on a backboard supporting the shelves 210. As another example, one or more sensors 221 may be affixed to the ceiling 220, one or more sensors 231 may be affixed to fixtures 230, and one or more sensors 241 may be affixed to the floor 240.

In some embodiments, the sensors (e.g., the one or more sensors 211, 212, 213, 221, 231, and/or 241) placed in the automated-checkout store 100 may comprise one or more image sensors (e.g., RGB cameras, IR cameras, depth cameras), one or more weight sensors, one or more force sensors, one or more pressure sensors, one or more vibration sensors, one or more proximity sensors, one or more resistance-based film sensors, one or more capacitive sensors, other suitable sensors, or any combination thereof. The sensors may be used to collect signals associated with one or more product items and one or more persons. In some embodiments, the sensors may be powered through one or more network cables using power over ethernet ("POE"). The sensors may also be powered using one or more other suitable methods or devices.

As an example and not by way of limitation, one or more weight sensors affixed to a shelf (e.g., one of shelves 210) may measure weights of one or more product items; one or more weight sensors affixed to a floor (e.g., floor 240) may measure weights of one or more persons present in the automated-checkout store 100; one or more pressure sensors affixed to the shelf 210 may measure the shape of bottom surfaces of the product items and determine their respective positions. One or more image sensors may determine the colors and other appearance characteristics of the product items.

As another example and not by way of limitation, vibration sensors placed on corners of a shelf 210 may be used to detect vibration corresponding to an event associated with product items placed on the shelf 210 (e.g., a customer picking up a product item). One or more proximity sensors (e.g., comprising one or more infrared transceivers) placed on a surface of the shelf 210 may detect a proximity of a hand of a customer to one or more product items, which may be used to determine a movement of the hand (e.g., hovering over a product item). The data gathered by the vibration sensors and the proximity sensors may be complemented by data from one or more image sensors which may comprise one or more images of the customer and the one or more product items. Based on the data collected by these sensors, a computer system associated with the automated-checkout store may determine one or more movements of the hand of a customer with respect to one or more product items and may thereby determine customer activities such as picking up a product item or placing a product item on a shelf 210.

As yet another example and not by way of limitation, a plurality of image sensors may be used to gather image data of a person moving in the automated-checkout store 100. One or more computing devices or components thereof (e.g., a graphics processing unit (GPU), a central processing unit (CPU), a system on a chip (SoC)) may be used to process digital images and videos captured by the image sensors. Each image sensor or group of image sensors may collect data from a particular area of the automated-checkout store 100. Data from each of one or more image sensors may be processed to determine a probability that a particular person is at a particular location. The processing results may be aggregated to determine a location of the person and to construct a model reflecting a movement path of the person during a particular period of time. The data gathered by the image sensors may be supplemented by data gathered by one or more weight sensors placed below the surface of the floor near the door 110 of the automated-checkout store 100. Changes to data from the weight sensors may indicate that a person walks in or out of the store 100.

In some embodiments, one or more image sensors in the automated-checkout store may be automatically calibrated. One or more projectors may be installed in the store. The projectors may project patterns on, for example, the floor or ceiling of the store. One or more parameters of the image sensors (e.g., position, angle, distortion factor) may be calibrated based on a portion of the pattern captured by the image sensors. Similarly, one or more patterns may be printed on one or more fixtures within the store (e.g., shelves 210). The image sensors may capture images of such patterns and automatically calibrate their parameters. In some embodiments, the projectors may also be used to project one or more images that may improve user experience. For example, price or other information about one or more products may be projected on the products.

The one or more sensors may have overlapping fields of view. Data from the one or more sensors may be fed into the computer system to be synthesized and/or integrated to acquire information of an entire automated-checkout store. In some embodiments, each of the image sensors may be calibrated using people as calibration markers. As an example, the computer system may identify body key points of persons as captured by the image sensors and match the identified body key points between the sensors. In some embodiments, the computer system may extract detections from each of the sensors, synchronize frames using timestamp, and cluster one or more persons using re-id features. The computer system may aggregate key points from one or more persons over a time period for each camera. The computer system may match key points of a same time and a same person on pairs of sensors to calibrate the one or more sensors. In some embodiments, the computer system may detect an object moving along a route and feature points on the object. The computer system may capture a first set of one or more images of the feature points of the object along the route by a first sensor and a second set of one or more images of the feature points of the object along the route by a second sensor. The computer system may calibrate the first sensor and the second sensor by matching the features points of the object along the route by the first sensor and the feature points of the object along the route by the second sensor at a same time stamp. In some embodiments, the computer system may calibrate one or more image sensors based on visual patterns or fixtures in an indoor environment. The computer system may process images of the visual patterns or fixtures and compare them with known locations and shapes of the visual patterns or fixtures to determine the locations and directions of the image sensors that captured the images. More information about calibration of image sensors is described in U.S. patent application Ser. No. 16/197,369, filed Nov. 21, 2018, which is incorporated herein by reference.

Figure 3A:
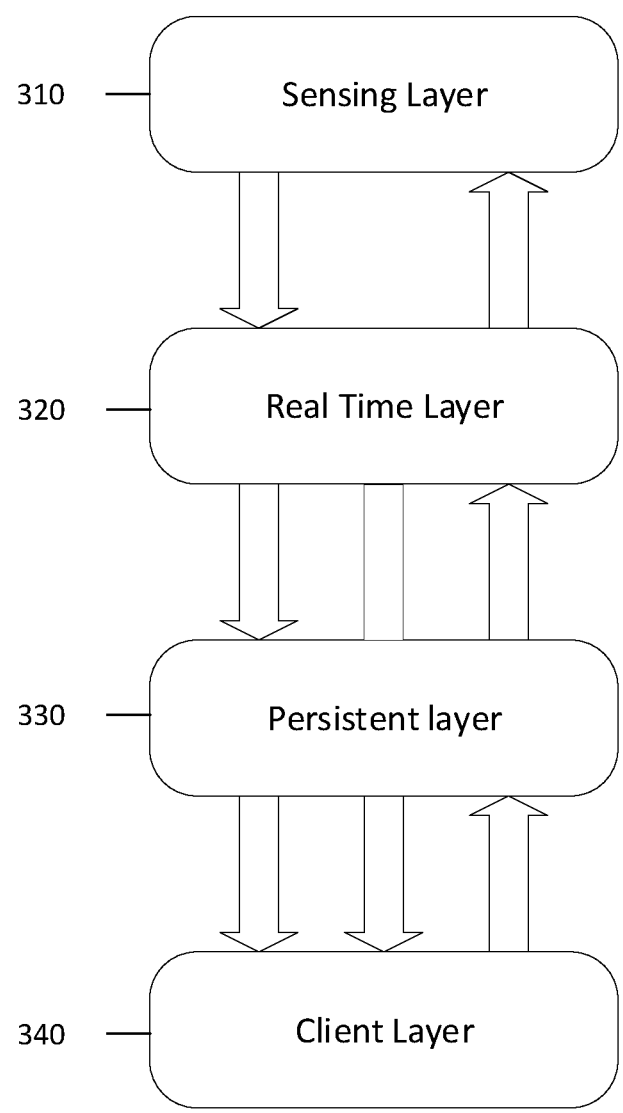
FIG. 3A illustrates an example system for tracking persons and interactions between persons and products in a store.

FIG. 3A illustrates an example system for tracking persons and interactions between persons and products in a store. In some embodiments, a computer system in an automated-checkout store may have the structure illustrated by FIG. 3A and may comprise one or more of the components or layers shown in FIG. 3A. In some embodiments, the system may be configured to receive many types of input from many different sensing sources. These inputs may include image and/or video signals from an array of cameras mounted in various parts of an automated-checkout store such as the ceiling, cashier level, shelf level, signals from touch capacitive sensors on shelves, signals from weight sensors on shelfs, signals from force sensors on shelfs, and/or vibration sensors on shelfs. The system may use these signals to identify a customer and monitor the product items that the customer takes out of the store, and thus automatically checkout the product items. The system may also use these signals to calculate an inventory level of each of a plurality of retail products within the store.

In some embodiments, the system may comprise a sensing layer 310 that include a plurality of sensors that provide the system with different types of data. One or more sensors (e.g., single camera (SC), multi-camera (MC), cameras at the checkout area of the retail store) may monitor people, such as customers and employees, as they move around and through the store. One or more sensors (e.g., capacitive sensors, force sensors, vibration sensors, weight sensors, location aware pressure sensors) may track objects such as retail products on a plurality of shelves. The sensing layer 310 may be implemented, for example, as the one or more sensors 211, 212, 213, 221, 231, and/or 241. The sensors may be controlled by the computer system. The computer system may deactivate one or more of the sensors due to inactivity to save energy. The sensors may be switched back to an active state based on, for example, signals collected by a neighboring sensor.

In some embodiments, the system may comprise a real time layer 320 that may determine when trigger events occur and determine logic of virtual carts. For example, the real time layer 320 may be configured to analyze the 3D rendering of motion of a particular customer and determine that the customer is reaching for an item on a particular shelf. Using this information along with weighting information from the particular shelf, as well as weight data, location aware pressure sensing data, and images of the particular shelf, the real time layer 320 may determine that a particular customer takes a particular product. The real time layer 320 may acquire information from a variety of sources, such as one or more sensors in the sensing layer 310, analyze the data in context with other data obtained from other sensors in the sensing layer 310 to obtain an accurate analysis of events occurring in the automated-checkout store. For example, the real time layer 320 at a present time may determine and log an event in which the particular customer puts a bunch of bananas in a shopping cart. Subsequent to the present time, the real time layer 320 may determine that out of a direct line of sight with one of the array of cameras in the retail store that the particular customer puts an item back on the shelf. Using weight information, location aware pressure sensing and vibration sensing, the real time layer 320 may output a plurality of probabilities of what the item that was placed on the shelf was. With the information that the bunch of bananas was previously placed in the shopping cart, the real time layer 320 may determine that the particular customer put the bunch of bananas back on the shelf.

The real time layer 320 may further store all logged events for each customer, for example, in a database or table, and acquire a historical record of each customer. For example, the real time layer 320 may store information from image data of a location of each customer at a specific time. For example, the real time layer 320 may determine a record of all products purchased by a particular customer, a date of purchase of each of the products, a price of each of the products, and/or a record of whether the particular customer returns items to a proper location or shelf. As an example, the real time layer 320 may determine, as part of the historical record, a frequency with which a person returns products to a proper shelf or location.

In some embodiments, the system may comprise a persistent layer 330 that may execute operations related to payments and customer authentication. For example, before a customer may be granted access to the automated-checkout store, the user may be required to swipe a credit card or provide login information. The persistent layer 330 may be configured to authenticate the user and/or payment method by the user.

In some embodiments, the system may comprise a client layer 340 that may execute operations related to client interaction. For example, the client layer 340 may provide an output or display at a checkout counter. The information displayed may comprise an itemized receipt of all of the items in a particular customer's possession. In some embodiments, the client layer 340 may be configured to provide personalized advertisement as the particular customer walks through the store. For example, if the system determines that the customer is a parent carrying a baby, as the customer walks down an aisle of baby products, the client layer 340 of the system may be configured to output advertisements of a sale for a particular brand of diapers. For example, the real time layer 320 or the client layer 340 may conduct an analysis to determine a frequency of purchase of each of the products and/or a frequency of purchase for each of brand names of specific products. In such a manner, the client layer 340 may provide suggestions to the particular customer, based on the determined frequency of purchase of a type or brand of product as the customer enters the automated-checkout store. As another example, the client layer 340 may provide suggestions to the particular customer based on prices of specific products. For example, the client layer 340 may be coordinated with a customer's device, which may include, for example, an electronic system such as a mobile phone, and/or a display, to provide suggestions communicated to the customer's device.

In some embodiments, the automated-checkout store may be associated with a computer system for processing the data collected by various sensors. The computer system may comprise one or more suitable electronic devices. In some embodiments, the computer system may use sensor fusion to aggregate data received from multiple sensors. In doing so, the computer system may combine sensory data or data derived from disparate sources using error-resistance algorithms such that the resulting information has less uncertainty than would be possible when these sources were used individually. Using sensor fusion, the computer system may derive additional data than that sensed by each sensor (e.g., calculation of depth information by combining two-dimensional images from two cameras at slightly different viewpoints). In some embodiments, the computer system may perform direct fusion, which may comprise the fusion of sensor data from a set of heterogeneous or homogeneous sensors, soft sensors, and history values of sensor data. The computer system may also perform indirect fusion that uses information sources like a priori knowledge about the environment and human input. The computer system may use one or more methods or algorithms such as the central limit theorem, Kalman filter, Bayesian networks, Dempster-Shafer theory, or convolutional neural network. In some embodiments, sensor fusion for an automated-checkout store may be performed at a centralized computer system. Alternatively or additionally, sensor fusion may be performed by one or more localized computer sub-systems, whose outputs may later be aggregated. In some embodiments, using sensor fusion, the computer system may calculate a distribution for a particular value to be determined, including an average, a range, and one or more deviations. The computer system may also assign trustworthiness values for different factors contributing and weigh the factors based on the trustworthiness values.

A Bayesian network, decision network, probability network, or probabilistic directed acyclic graphical model may be a probabilistic graphical model (a type of statistical model) that represents a set of variables and their conditional dependencies via a directed acyclic graph (DAG). Nodes in a DAG may represent variables such as observable quantities, latent variables, unknown parameters, or hypotheses. Edges in a DAG may represent conditional dependencies; nodes that are not connected (no path connects one node to another) represent variables that are conditionally independent of each other. Each node may be associated with a probability function that takes, as input, a particular set of values for the node's parent variables and gives (as output) the probability (or probability distribution, if applicable) of the variable represented by the node. Bayesian networks may be used to take an event that occurred and predict the likelihood that any one of several possible known causes was the contributing factor. Bayesian networks may be used to infer unobserved variables or to learn parameters or structures.

Figure 3B:
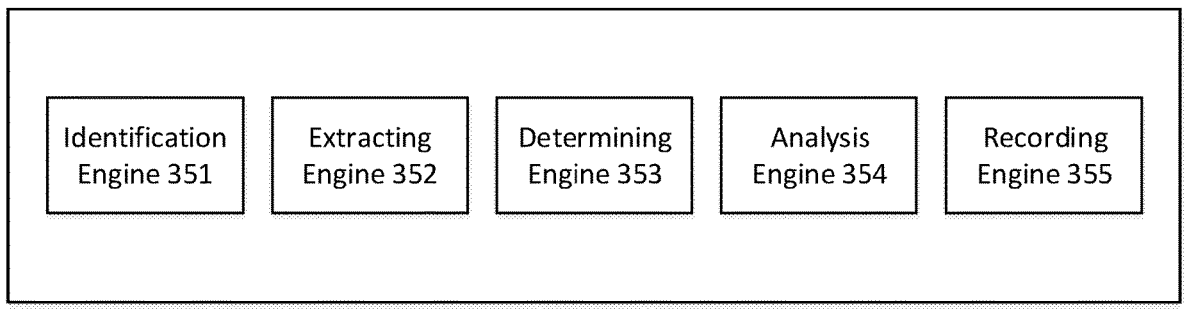
FIG. 3B illustrates example components of a computer system for tracking persons in an automated-checkout store.

FIG. 3B illustrates example components of a computer system 350 for tracking persons in an automated-checkout store. The real time layer 320 may be implemented on such a computer system 350. One or more other layers of the system 300 may also be implemented on the computer system 350. The computer system 350 may include an identification engine 351, an extracting engine 352, a determination engine 353, an analysis engine 354, and a recording engine 355. The computer system 350 may comprise one or more other suitable components. In some embodiments, the engines 351-355 may represent logical rather than physical divisions of the operations and functionalities of the computer system 350. In some embodiments, one or more of the engines 351-355 may be combined in one physical system sharing one or more processors, memories, databases, or other computing resources. In some embodiments, each of one or more of the engines 351-355 may have different sub-components implemented on different physical systems. In some embodiments, processor-executable code or software programs may implement one or more of the engines 351-355, one or more parts of the engines 351-355, or any combination thereof.

The identification engine 351 may be configured to identify a plurality of features of a person (e.g., customer). The identification of the features may be based on data associated with the person and collected by a plurality of image sensors such as in the sensor layer 310. The identifying may comprise assigning an identifier to the person and storing the features of the person in association with the identifier. The features of the person may include, as an example, facial, body, or hair features, clothing of the person, measurements of the person such as height or weight, and/or a distinctive gait or walking style of the person. The identifier may be unique for each person, and may be static or constant. For example, the identifier for each person may be unchanged every time the person walks into the automated-checkout store, and/or every time the person reappears after being lost (e.g., obscured, obstructed, or blocked by another person or landmark). The identification engine 351 may be configured to re-identify a person as he or she exits a field of view of one or the image sensors and enters a field of view of a neighboring image sensor. In some embodiments, the identification engine 351 may identify a person by linking the identifier with a person's valid payment credentials, such as a credit card, when the person enters the automated-checkout store. The person's features as recorded by the image sensors may be linked, by the identification engine 351, to the payment credentials. As a result, items removed by the person from a shelf location may be linked to the person's payment credentials, so that the person can be charged for each purchased item. In some embodiments, the identification engine 351 may determine a person's identity by determining a match between previously stored features of persons saved in a database, memory, or lookup table, and real-time features determined from the image sensors. In this way, the computer system 350 may automatically identify payment credentials associated with the person that have been previously stored based on the determination of the person's identity.

The extracting engine 352 may be configured to extract data associated with the person from the received data that was collected by the image sensors. The data associated with the person may be extracted based on the features associated with the identifier of the person. The extracted data may correspond to a plurality of time periods. As an example and not by way of limitation, the system 350 may have received a plurality of images captured by a plurality of image sensors in a shopping environment. The extracting engine 352 may match the identified features of a person with one or more of the received images to identify those images that include the person. The extracting engine 352 may provide these images for further processing. As another example and not by way of limitation, the extracting engine 352 may determine a location of a person in a preceding time period. It may identify one or more of the image sensors each having a field of view that encompasses the determined location. It may obtain data collected by such identified image sensors in the relevant time period for use in determine the location of the person.

The determination engine 353 may be configured to determine a location of a person in each of a plurality of time periods based on the extracted data corresponding to the time period (e.g., the respective time period corresponding to the location of the person). The determination engine 353 may be configured to aggregate the extracted data collected by different image sensors based at least in part on a location and a line of sight of each of the image sensors. The aggregating the extracted data may comprise, identifying one or more pixels corresponding to the person in each of the images, determining a plurality of lines in a three-dimensional space, wherein each of the lines may be determined based on a position of one of the identified pixels in the image containing the pixel and the line of sight of the image sensor capturing the image, and determining one or more intersection areas of the lines. The determined intersection areas of the lines may be determined to be the location of the person. The determination engine 353 may use various triangulation methods to determine the intersection areas.

In some embodiments, the plurality of image sensors may correspond to a plurality of groups each comprising one or more of the image sensors. The aggregating the extracted data may comprise, processing the data collected by each group of image sensors to obtain analysis results, and aggregating the analysis results associated with the plurality of groups of image sensors. The division of image sensors into different groups and separate processing of data from each group may reduce processing power consumption and improve scalability of particular embodiments disclosed herein.

In some embodiments, the determination engine 353 may be configured to combine the extracted data with data collected by one or more other sensors (e.g., vibration sensors, weight sensors) to improve the performance of tracking persons. As an example and not by way of limitation, the determination engine 353 may further receive signals gathered by one or more vibration sensors beneath the floor of a store. The signals may be generated when a person walks by a corresponding sensor. The signals may be analyzed to extract one or more features identifying each person. The determination engine 353 may determine a location of a person based on the location of a sensor that collects vibration signals associated with the person. The determination engine 353 may compare such determination with a determination of the person's location using image data to find out the person's location in a more accurate manner. As another example and not by way of limitation, the determination engine 353 may receive data from a weight sensor placed near an entrance associated with a store. The data from the weight sensor may reflect a significant change each time a person enters the store. The determination engine 353 may thereby determine a total number of persons in the store. In particular situations, based on image data from various image sensors, the determine engine 353 may determine that it is ambiguous whether, in a particular region, there is one person or two persons in proximity to each other. The determine engine 353 may determine the number of persons in the region by checking the total number of persons in the store.

The determination engine 353 may be configured to determine a movement path of the person based on the location of the person in each of the time periods. The determined movement path of the person may be determined by connecting the determined locations of the person in the time domain. In some embodiments, a person may move out of the field of view of certain image sensors and into the field of view of certain other image sensors. The system 350 may be configured to adapt to such movement. In some embodiments, the determination engine 353 may be configured to determine that the person exits the field of view of one or more of the identified image sensors (e.g., identified by the extracting engine 352) and enters the field of view of one or more other image sensors, for example, adjacent or directly adjacent to the identified image sensors. The determination engine 353 may determine the person's locations from this point of time on based on data collected by one or more other image sensors, whose field of view encompasses the new locations of the person.

In some embodiments, the determination engine 353 may be configured to determine a plurality of possible locations of the person. The determination engine 353 may be configured to determine a probability value of each of the possible locations, that the person is actually present at each of the possible locations. The determination engine 353 may be configured to select one of the possible locations as the location of the person based at least in part on the probability values associated with each of the possible locations of the person. For example, the determination engine 353 may be configured to select a location with a highest associated probability value out of all the probability values. As another example, the determination engine 353 may be configured to select the location with the highest associated probability value only if the associated probability value is above (or equal to) a threshold. If the highest associated probability value is less than the threshold, the determination engine 353 may not select a location. The determination engine 353 may then determine or predict a location of the person based on data from other sensors (e.g., the one or more sensors 211, 212, 213, 221, 231, and/or 241).

In some embodiments, the determination engine may be configured to select one of the plurality of possible locations as the location of the person based at least in part on a previous movement path of the person. In a particular situation, the determination engine may have determined two possible locations of a person. One of the possible locations may be in proximity to a previous location of the person, indicating continuous movement of the person. The other location may include a substantial change to the location of the person in a short period of time. The determination engine 353 may choose the latter based on the previous movement path of the person.

In some embodiments, the system 350 may automatically recover from a loss of the location of a particular person. The system 350 may be configured to detect a failure of locating a person in a preceding time period, for example, because of being blocked or obstructed by a landmark, product, or another person in a field of sight of the one or more image sensors in the automated-checkout store, or because of a defect in one of the one or more image sensors. For the current point of time, the system 350 may re-identify one or more images that contain the person based on identified features of the person. The system 350 may identify one or more image sensors that have collected the data about the person in the current point of time and re-locate the person based on data collected by the identified image sensors.

Once a person inside the automated-checkout store is identified and a location of the person is determined, the analysis engine 354 may be configured to analyze the 3D rendering of motion of the person and determine actions that the person is taking, for example, reaching for an item on a particular shelf, placing the item into a shopping cart, or returning the item back to the particular shelf or another shelf.

The recording engine 355 may be configured to log and store all logged events for each person in the automated-checkout store. For example, the recording engine 355 may be configured to log and store all logged events for each person in a database or table, to acquire a historical record of each of its customers, as described with regard to real time layer 320.

Figure 4:
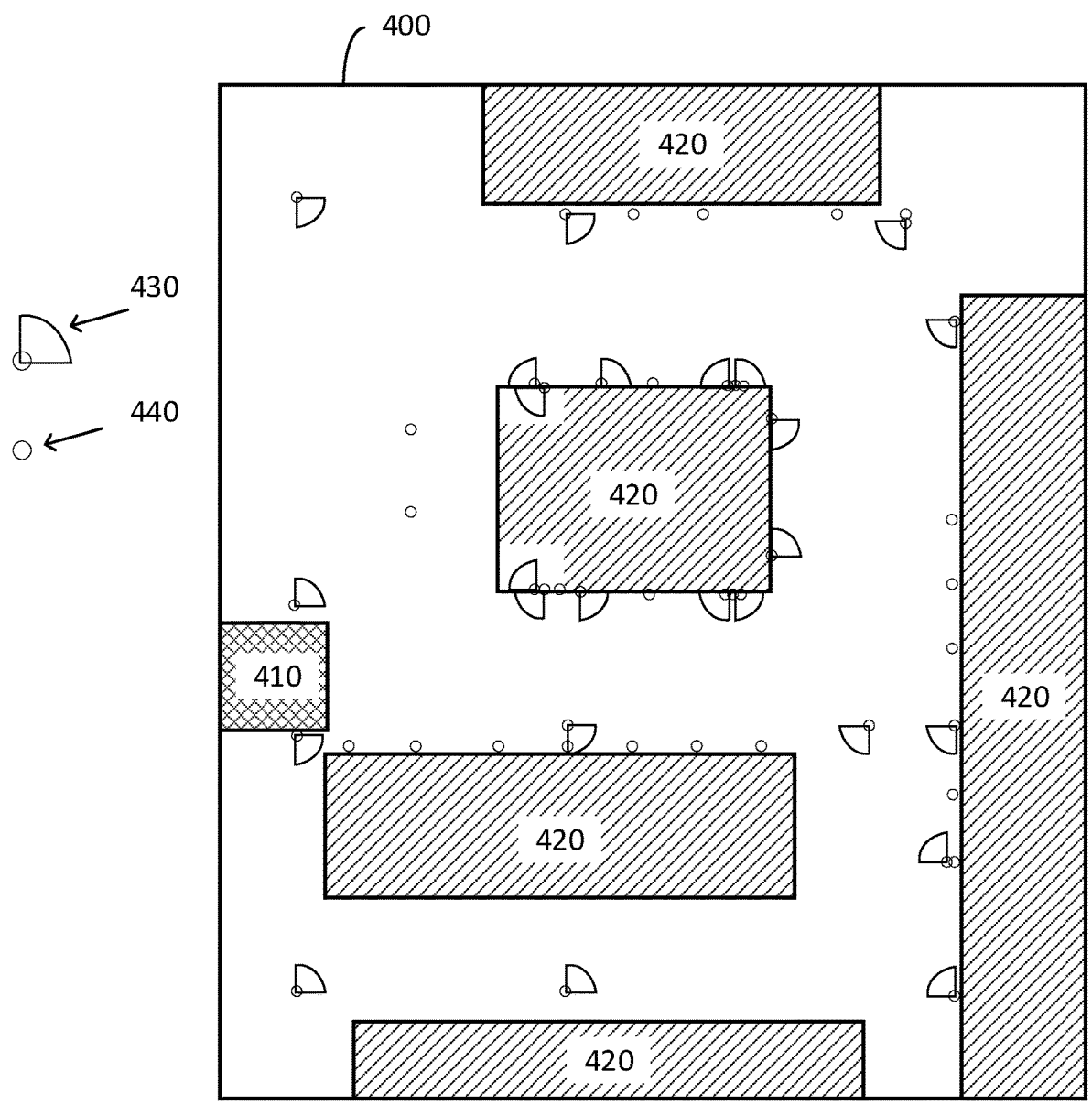
FIG. 4 illustrates an example sensor system in an automated-checkout store.

FIG. 4 illustrates an example sensor system 400 in an automated-checkout store. Illustrated by FIG. 4 may be an inner space of an automated-checkout store. FIG. 4 may include an entrance, exit, or fixture 410, one or more shelves 420, one or more tracking cameras 430, and one or more depth cameras 440. In some embodiments, no depth cameras 440 may be necessary for or used in the system. As an example, the one or more tracking cameras 430 may comprise RGB cameras or IR cameras. The one or more tracking cameras 430 and/or the one or more depth cameras 440 may be implemented as part of, controlled, or coordinated by a computer system, which may be implemented, for example, as system 300, as shown and described in FIGS. 3A-3B. The sensor system 400 may comprise a hierarchical, modularized sensor system in which the one or more tracking cameras 430 and/or the one or more depth cameras 440 may be divided into groups. Each of the groups may comprise one or more image sensors configured to capture and/or monitor a section of the automated-checkout store. Data collected by each group may be separately processed and analyzed by a computer sub-system comprising one or more processors (e.g., CPUs, GPUs). Then, the results of various computer sub-systems may be combined and derive results covering an entire space. Such a modularized design save processing power using separate and parallel processing of data from the image sensors. With such a modularized sensor system, a complexity of a tracking a certain area may grow linearly with the size of the area, instead of squared or higher growth. Image sensors arranged in such a modularized manner may provide high scalability for large shopping spaces. The computer system for such a sensor system 400 may use a unique identifier for each person in the area monitored by the sensor system 400 across different groups of sensors. The computer system may determine locations of persons using a machine-learning model based on data collected by the image sensors 430 and 440. The sensor system 400 may determine and/or output the locations where the persons are present, for example, as bounding boxes.

Each of the tracking cameras 430 and the depth cameras 440 may comprise a field of view in which people and/or objects may be captured and/or monitored. Some of the tracking cameras 430, such as tracking cameras 430 that neighbor each other, may have fields of view with overlapping portions. In some embodiments, the tracking cameras 430 may or may not have fixed locations. The tracking cameras 430 may be automatically calibrated such that if a location of a tracking camera 430 is changed, the tracking camera 430 may automatically and/or dynamically detect its updated location. As an example, the tracking cameras 430 may be calibrated by detecting an object moving along a route and feature points on the object by multiple tracking cameras 430. The tracking cameras 430 may capture a first set of one or more images of the feature points of the object moving along the route by a first tracking camera 430 and a second set of one or more images of the feature points of the object moving along the route by a second tracking camera 430 and recording a time stamp for each capture. The tracking cameras 430 may be calibrated by matching common feature points of the object from the first set and the second set of the images.

At the entrance, exit, or fixture 410 of the store, the computer system may identify an account associated with a person who enters the store. In some embodiments, the computer system may determine that a person enters the store based on signals from one or more of the sensors such as, for example, a tracking camera 430 pointing at the door of the store or a weight sensor below the floor near the door. In some embodiments, the computer system may identify an account associated with the person based on information provided by the person. For example, the person may be required to swipe a credit card or provide login information before being granted access to the store. The computer system may identify the account associated with the person based on information associated with the credit card or the login. In some embodiments, the computer system may determine an account based on a determined identity of the user. The computer system may determine the identity of the person based on data received from one or more of the sensors, such as tracking cameras 430. The received data may be fed into a machine-learning model, such as a deep learning network, a feature matching model, and/or a combination of one or more neural networks, for determining an identity of users. The model may comprise features corresponding to characteristics such as facial, body, or hair features, clothing of the person, measurements of the person such as height or weight, a distinctive gait or walking style of the person, and/or other suitable features specified by human or generated by machine-learning algorithms, or any combination thereof. The machine-learning model may have been trained by real-world data or data generated by simulations. For example, the training data may be generated by modifying real-world images by changing a background or environment in which a person is located to be a plurality of options. The training data may be tested and verified. The collected data may be compared with data stored by or otherwise accessible to the computer system that correlate accounts or identities of persons with characteristics of their appearance. In this manner, the account associated with the person may be identified without input from the person.

The computer system may obtain data on movement of a product item on a shelf 420 of the automated-checkout store collected by one or more of the sensors (e.g., the one or more sensors 211, 212, 213, 221, 231, and/or 241). The movement of the product item may indicate that an event has occurred to the product item. The event may comprise, for example, a product item being picked up by a person, a product item being placed in a shopping cart, a product item being placed back on a shelf 420, another suitable event, or any combination thereof.

The computer system may determine an interaction between the person and the product item based on data collected by one or more of the sensors. In some embodiments, to determine an interaction between the person and the product item, the computer system may determine, based on data received from one or more of the sensors, that the person is located in proximity to the product item in a period of time. The computer system may then detect one or more movements of a hand of the person with respect to the product item and determine the interaction based on the one or more detected movements. In some embodiments, the computer system may perform gaze-tracking or eye-tracking on a person, based on which the computer system may determine one or more product items that the person is looking at. For example, one or more IR cameras 430 may be placed on a shelf 420 and be configured to catch light reflected from eyes (e.g., retinas) of the person. Based on data associated with the captured light, the computer system may determine a direction of the gaze of the person, thus determining one or more product items that the person is looking at.

In some embodiments, the computer system may be configured to utilize machine-learning models to keep track of inventory of product items and people interacting with the product items. The computer system may receive data from a plurality of sensors and apply the data to machine-learning models. The different sources may include digital images or videos from an array of cameras (e.g., tracking cameras 430) mounted in various parts of a retail store, such as the ceiling, cashier level, shelf level cameras (e.g., tracking cameras 430), signals from weight sensors, force sensors and vibration sensors on shelves 420. The different types of data may be used to train the machine-learning model, and allow the machine-learning model to learn and recognize actions performed by customers in the retail environment and label these actions for future recognition. In addition to currently-received sensor data, the computer system may also consider previously-received data in determining the interaction. In particular, the computer system may calculate a conditional probability of a particular activity of a person based on prior detected activities of the person.

In some embodiments, digital images and video may be used with the support of other types of sensors to recognize the interaction between persons and product items placed in various areas of the store. The computer system may be configured to recognize consumer shopping behavior by estimating a three-dimensional (3D) location of a person's hand using digital images captured by the array of cameras (e.g., tracking cameras 430). The recognition may be used by the machine-learning algorithm to recognize and provide a probability of various shopping behavior of the person in the retail environment. The shopping behavior may include the motion of a person's body, arms, or hands in an action of removing a product item from a shelf 420 or returning the product item to the shelf 420.

In some embodiments, a plurality of image sensors may be used to predict the 3D location of body joints. Red-green-blue (RGB) cameras 430, as well as infrared (IR) image sensors (e.g., cameras 430) may be used to capture two-dimensional (2D) images. The 2D images may be analyzed to obtain 3D locations. Alternatively or additionally, one or more depth cameras 440 may be used to determine the depth of a body joint into an area containing a product item. The one or more depth cameras 440 may be used jointly with the other cameras (e.g., tracking cameras 430) to estimate the 3D locations of a person's body joints. The 3D hand location of the consumer may be estimated using digital images or video.

In some embodiments, the computer system may use the image data in conjunction with data received from weight sensors and location aware pressure sensors to predict a quantity and type of product items interacted with by the person. The machine-learning algorithm may be trained to connect and recognize certain motions of the person with changes in the placement of the product items. For example, the array of cameras (e.g., tracking cameras 430) may capture the person reaching for a product item on the shelf 420. The machine-learning model may be trained to recognize, through the analysis of 3D motions of the person, the motion of the body joints of a consumer which leads to the consumer reaching for the product item placed on the shelf 420. Using the analysis of the 3D motion alone, the machine-learning algorithm may not be able to obtain a probability of the retail product removed with high confidence if the consumer removed an item from the back of the shelf 420, or out of the range of the array of cameras (e.g., tracking cameras 430). The computer system may obtain data from the weight sensors or location aware pressure sensors to determine a change in the weight or pressure of a particular bin of the shelf 420 to aid in identifying the retail product removed from the smart shelf system with higher confidence.

In some embodiments, the computer system may use data collected by one or more weight sensors or one or more capacitive sensors to determine movement of a product item caused by interaction of a user. As an example and not by way of limitation, one or more load cells using resistive strain gauges may be fixed to one or more beams associated with a shelf 420. A force applied to the beam may cause a change to the resistance of the strain gauge, thus generating a voltage output. The voltage output may be proportional to the force. The voltage output may be communicated to the computer system through an interface circuit. In this manner, weights of product items placed on different areas of the shelf 420 may be detected. As another example and not by way of limitation, an array of capacitance-sensing elements (e.g., using capacitive sensors) may be placed on a shelf 420. Because product items have different dielectric constants from air, placing a product item on the shelf 420 may generate a change to the capacitance sensed by one or more of the capacitance-sensing elements. The change to the capacitance may depend on the material of the product item. A footprint of a product item (e.g., an image corresponding to the shape of a bottom surface of the product item, magnitude of signal corresponding to the material of the product item) may be generated based on data collected by the capacitance-sensing elements. Furthermore, a person touching a product item may also cause a change to the capacitance signal. In some embodiments, a shelf 420 may be configured to sense weight and capacitance by integrating weight-sensing load cells with a capacitance-sensing surface. Alternatively, a capacitance-sensing surface may be made weight-sensitive by incorporating a material that changes in capacitance based on force felt. In some embodiments, the computer system may detect movement of a product item, a location of the product item that is moved, or a person's touching the product item based on signals received from the weight sensors and capacitive sensors.

In some embodiments, the computer system may further use data collected by one or more vibration sensors to determine an interaction between a person and a product item. The computer system may comprise a frequency-feature based extraction algorithm to detect an onset of a vibration signal. The system may use visual signals from cameras (e.g., tracking cameras 430) to assist to identify a product. For example, when a particular product item is picked up, the event may generate a particular vibration frequency, which may be recorded by one or more vibration sensors. Based on identification of the product item by one or more image sensors or one or more other sensors, the system may associate the particular frequency signature with the particular product items. The system may subsequently use the frequency signature to identify the event that this particular product is picked up.

A frequency-feature based extraction algorithm may also be utilized to track and monitor people's behaviors. The system may be configured to sense and analyze vibration caused by human interactions in the store. For example, vibration of the ground, the sound created by footsteps, the opening and closing of cold storage doors, shopping cart usage, pattern of picking up or putting back product, etc. may be detected and analyzed by the vibration sensors.

These vibration signals, coupled with visual recordings from image sensors, may be used to extract a customer's behavior characteristics. When a person is in a blind spot, or changes her appearance, such that the system has difficulties to identify the person based on image data, the system may use the vibration signals to re-identify the person.

In some embodiments, the computer system may determine, based on data received from one or more of the sensors, a movement path within the automated-checkout store associated with the person. In some embodiments, the computer system may identify one or more features (e.g., appearance features of face, body, or cloths, visual patterns of walking, vibration frequency signature when walking) associated with the person and use the features to track the movement of the person. In some embodiments, the space within the automated-checkout store may be divided into a plurality of regions, each monitored with a set of image sensors (e.g., four cameras such as tracking cameras 430 at the corners of a rectangular region) and/or one or more other sensors. The person's movement path in each region may be separately tracked by the sensors corresponding to the region. The tracking results for different regions may then be integrated by concatenating overlapping areas and optimizing from the perspective of the entire store perspective. Based on the data collected by the sensors, the computer system may construct a model describing the 3D movement of the person. In some embodiments, one or more piezoelectric sensors or piezo film sensors may be used in conjunction with image sensors to determine a person's movement path within the automated-checkout store. The piezo film sensors may be embedded in the floor of the automated-checkout store (e.g., in one or more floor tiles). The piezo film sensors may generate electrical signals in response to steps of a person. The computer system may determine a trajectory of the person based on signals from a plurality of piezo film sensors located in a plurality of locations within the automated-checkout store.

In some embodiments, data of people trajectory and body key points can also be collected for video analysis to help optimize store layouts and personalized product recommendation. Global optimization can be performed to integrate data from different sensors. For example, total number of people in the store can be detected by monitoring how many people enter through the door. The total number of people in the store can be used in global optimization. For example, if two modules have disagreements on two people images close in distance. If the two images are counted as two people, the total number of people in store may be more than the total number entering the store counted by the system. In that case, the global optimization can be performed to count those two images as one person.

In some embodiments, the computer system may store information associating the product item with the person. In some embodiments, based on the determined interaction between the person and the product item, the computer system may determine that the person has taken the product item in possession with an intent to purchase the product item. The information associating the product item with the person may indicate that the product item will be purchased by the person. In some embodiments, another determined interaction between the person and the product item (e.g., placing the product item back on a shelf 420) may indicate that the person intends to return the product to the store. In this case, the computer system may remove the stored information associating the product with the person or store additional information indicating that the product item is has been returned by the person.

In some embodiments, the computer system may recognize an identity of the product item that is interacted with in order to associate the product item with the person. In some embodiments, the computer system may extract, from data received from one or more of the sensors, one or more features associated with the product item. The features may comprise a weight, a shape, a color, a surface force image, a position, or a conductivity. The computer system may then determine, using a machine-learning model, an identity of the product item based on one or more of the extracted features. In some embodiments, for product items that are difficult to distinguish based on the external characteristics (e.g., clothes, electronics) or product items that are of particular importance (e.g., expensive or luxury products), the automated-checkout store may use other suitable methods to verify the identity of the product item. For example, RFID tags may be applied to the product items. The store may further comprise one or more RFID sensors to read the RFID tags and determine the identities of the product items.

In some embodiments, characteristics of product items such as weight, visual appearance, surface force image, and conductivity may be used to identify the product. Information about such characteristics of each product may be stored in the computer system. For a product item interacted with by a person, one or more sensors may collect information about such characteristics of the product item. For example, one or more cameras, such as tracking cameras 430, may capture images (e.g., RGB images, images with depth information) of the product item. As another example, one or more weight sensors, capacitive sensors, and/or force sensors may collect information about the weight, shape, conductivity, and surface force image of the product item. The conductivity information may be used to determine the type of material which makes up at least a part of the product. The surface force image may be used to determine footprint of the retail product and the force exerted by the surface of the product.

In some embodiments, data from different sensors may indicate different identities of a product item. The computer system may determine one of the identities based on a confidence score associated with each identity. For example, the computer system may determine, based on data received from a first sensor, a first identity for the product item associated with a first confidence score. The computer system may determine, based on data received from a second sensor, a second identity for the product item associated with a second confidence score. The computer system may select one of the first identity and the second identity as the identity of the product item based on a comparison of the first confidence score and the second confidence score.

In some embodiments, for a characteristic of a product item that may take a value within a range, the computer system may determine the value based on a combination of data from different sensors. For example, the computer system may obtain, based on data received from the sensors, a plurality of values associated with a characteristic of the product item. Each of the values may be determined based on data received from one of the sensors. The computer system may determine a final value corresponding to the characteristic based at least in part on a weighted average of the plurality of values. The weight assigned to each value may be based on a confidence score associated with the sensor corresponding to the value.

The computer system may deduct a payment amount from the identified account, wherein the payment amount is based on a price of the product item associated with the person. In some embodiments, the computer system may obtain a price for each product item that has been interacted with by the person (e.g., picked up and placed in a shopping cart). When the person is exiting the automated-checkout store, the computer system may generate a list of product items purchased by the person, itemized prices, and a total amount to be paid by the person. The itemized receipt may be displayed or printed out for the person by a kiosk or another suitable electronic device (e.g., an iPad). The itemized receipt may also be sent to the person by, for example, emails or text messages. The total amount may then be charged to the account associated with the person. In some embodiments, based on input of the person (e.g., swipe of a card, login information) or pre-stored information, the computer system may obtain and hold a token associated with the person, which may be provided to a third-party payment service provider to charge the person. In some embodiments, the computer system may keep any information about the person without uploading the information to the cloud but only transmit a token associated with the person to an external system. In this manner, the computer system may protect the privacy of the person.

Figure 5A:
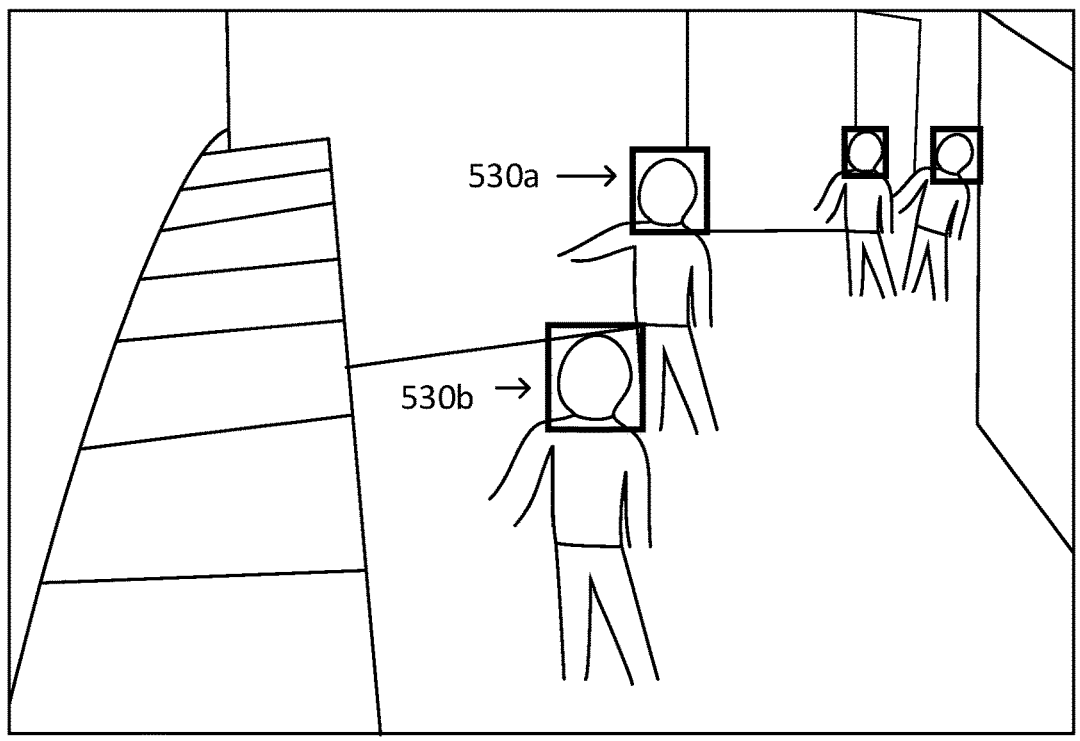
FIGS. 5A-5I illustrate example sensor data that may be processed for detecting persons.
Figure 5B:
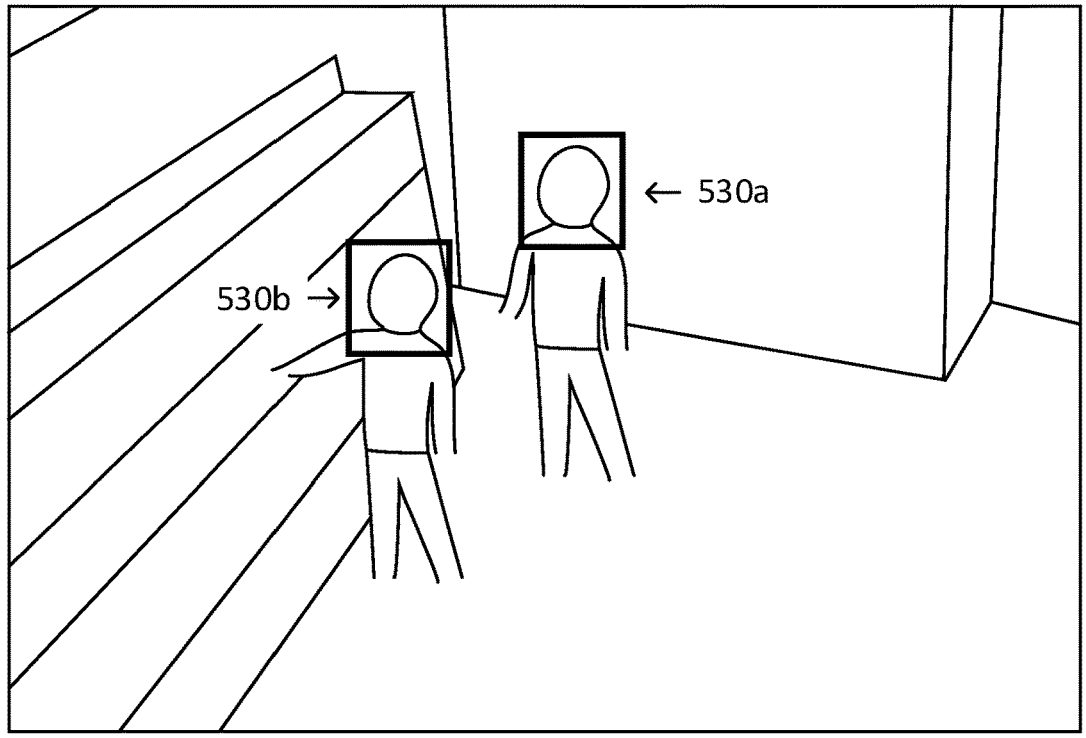
Figure 5C:
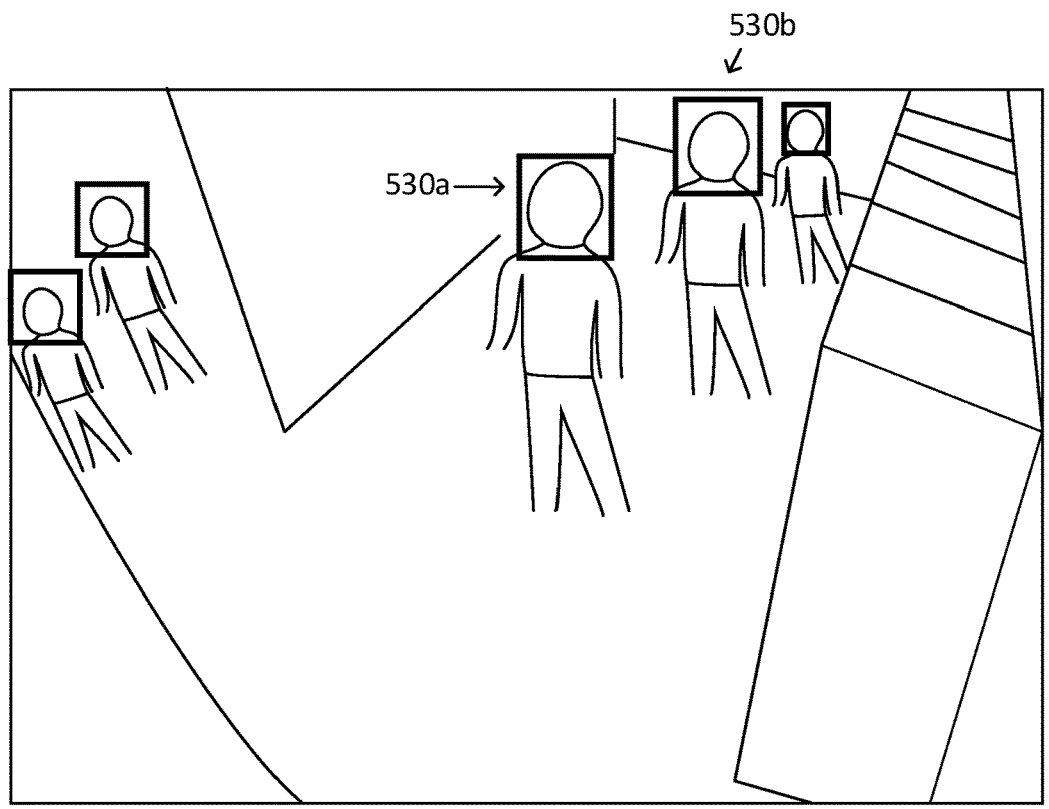
Figure 5D:
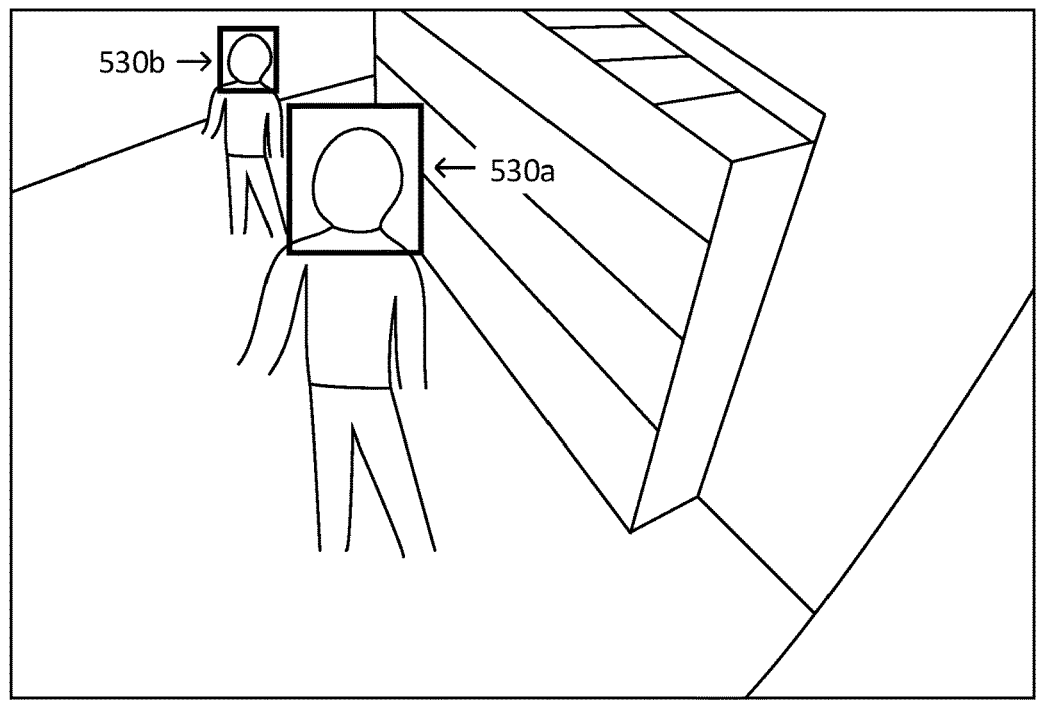
Figure 5E:
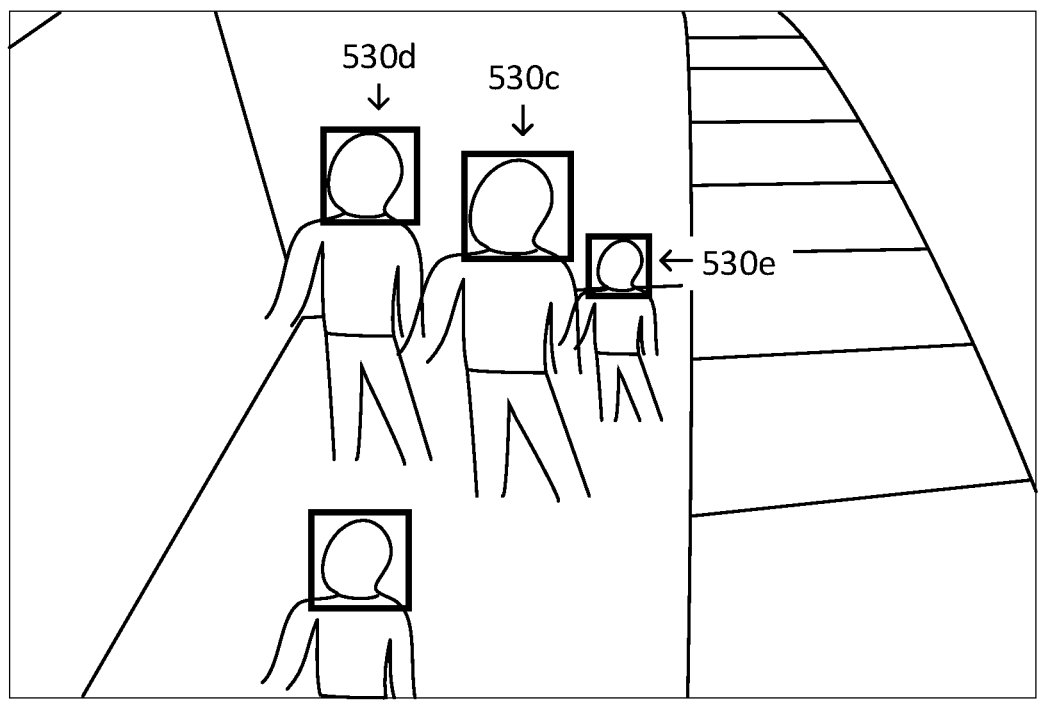
Figure 5F:
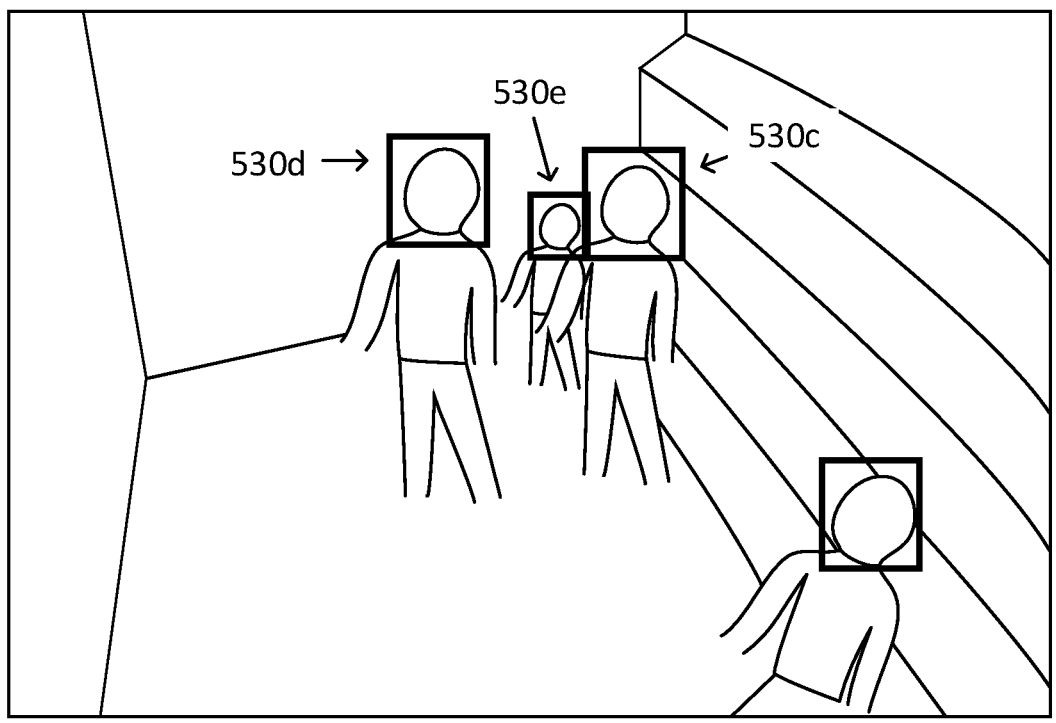
Figure 5G:
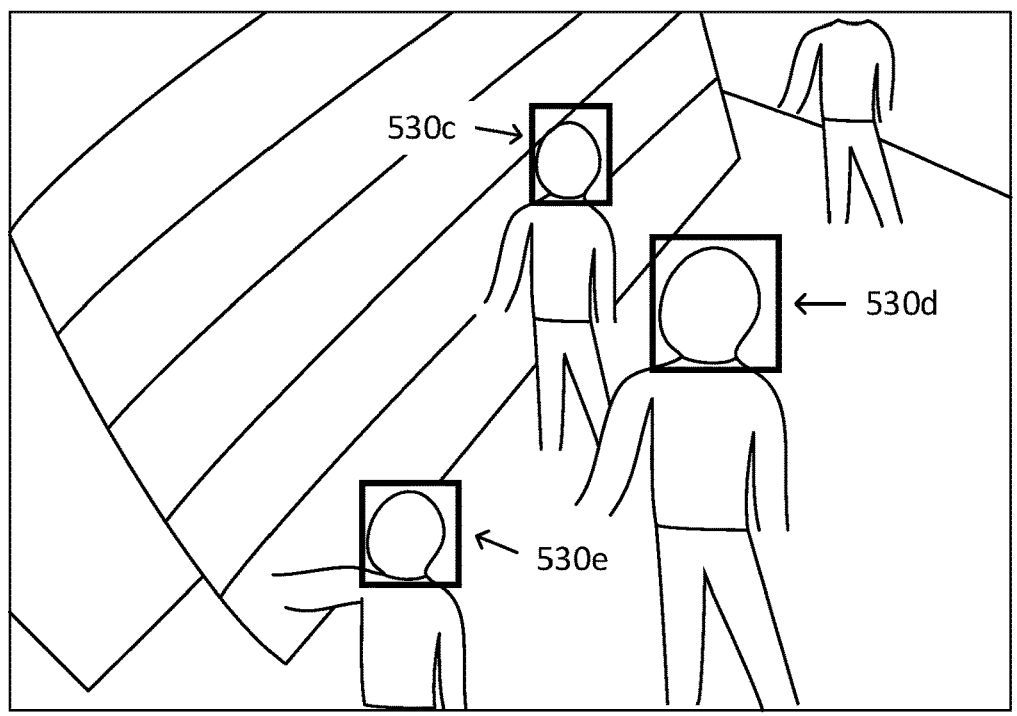
Figure 5H:
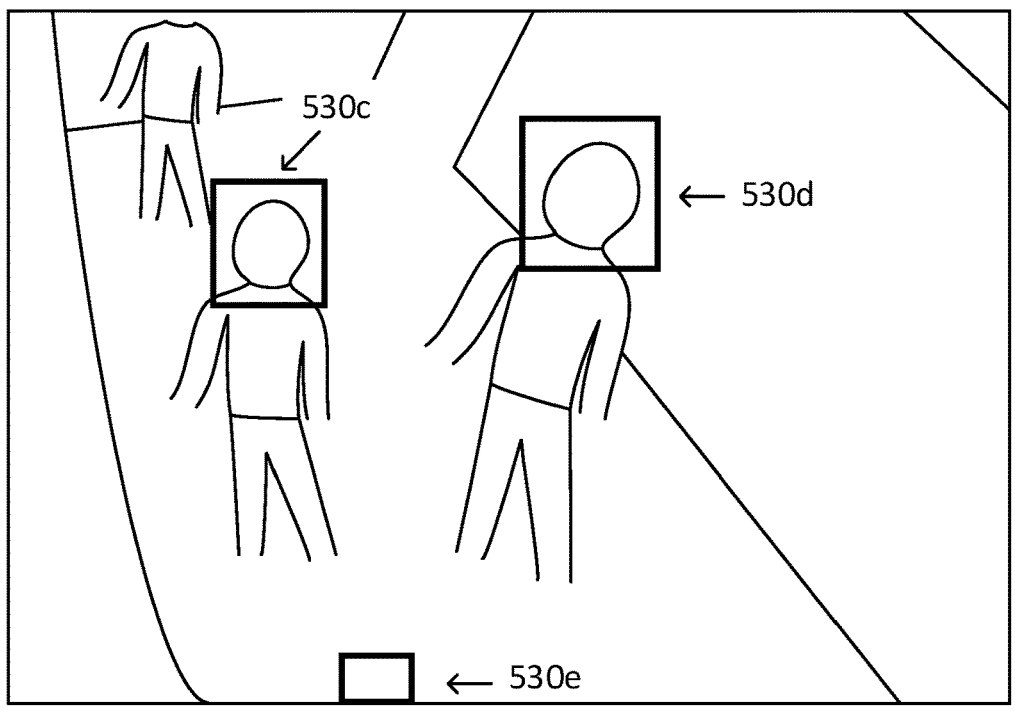
Figure 5I:
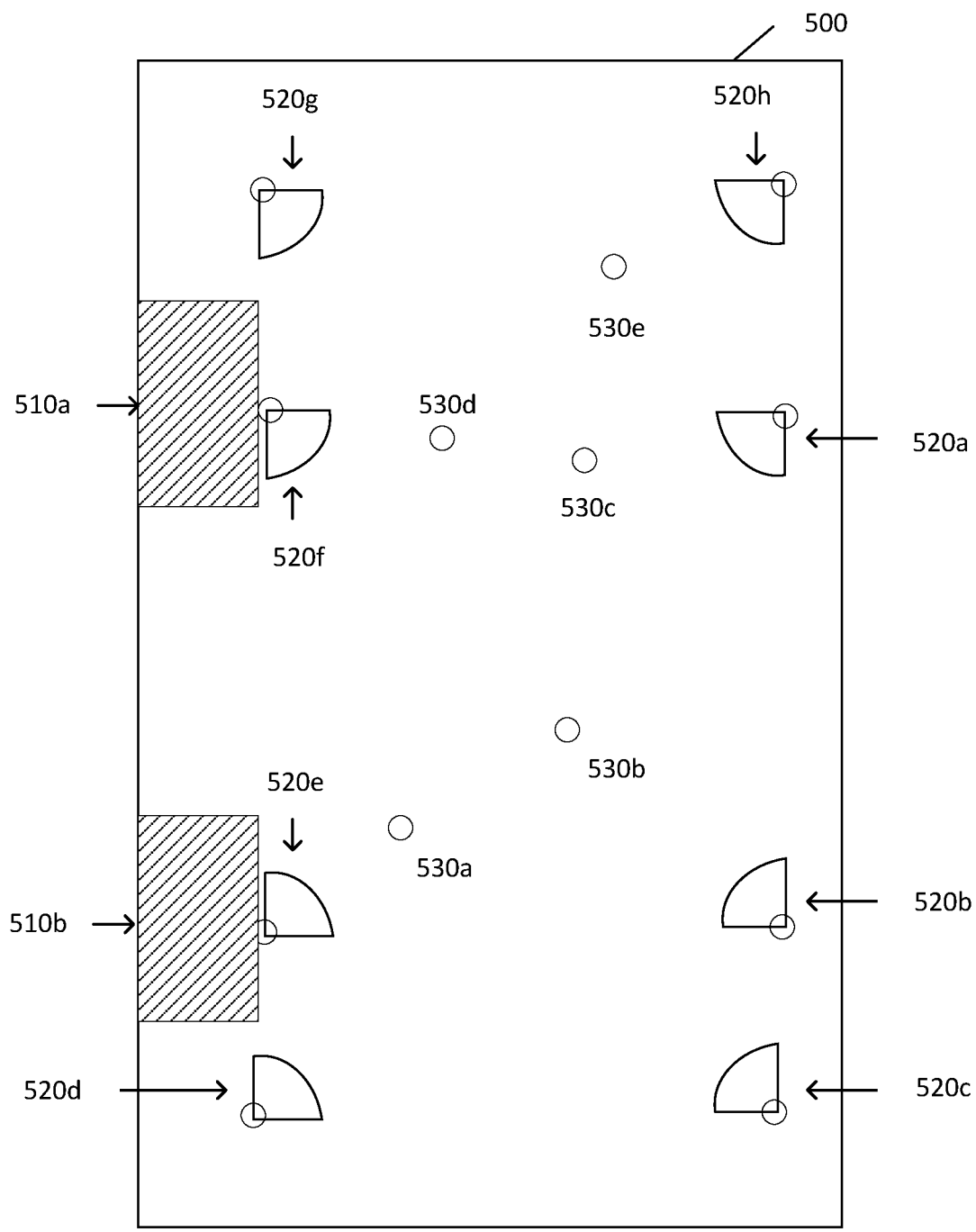

FIGS. 5A-5I illustrate an example sensor system 500 for detecting persons using image sensors. The sensor system 500 may be implemented as part of sensor system 400 and/or implemented as part of, controlled, or coordinated by a computer system, which may be implemented, for example, as system 300. As shown in FIG. 5I, cameras 520a, 520b, 520c, 520d, 520e, 520f, 520g, 520h may be implemented as tracking cameras 430. Cameras 520e and 520f may be affixed to fixtures 510b and 510a, respectively. Each camera may have a field of view that encompasses one or more persons 530a, 530b, 530c, 530d, 530e.

FIGS. 5A-5H illustrate images captured by the cameras. One or more persons may be identified in the images based on one or more key points or body segments. For example, as indicated by the bounding boxes in FIGS. 5A-5H, the persons may be identified based on their heads. The persons may alternatively be identified based on one or more other key points, such as necks, elbows, hands, another suitable body segment, or any combination thereof. FIG. 5A depicts a field of view of the camera 520a. The field of view of the camera 520a includes persons 530a and 530b. FIG. 5B depicts a field of view of the camera 520b. The field of view of the camera 520b may include persons 530a and 530b. FIG. 5C depicts a field of view of the camera 520c. The field of view of the camera 520c includes persons 530a and 530b. FIG. 5D depicts a field of view of the camera 520d. The field of view of the camera 520d includes persons 530a and 530b. FIG. 5E depicts a field of view of the camera 520e. The field of view of the camera 520e includes persons 530c, 530d, and 530e. FIG. 5E depicts a field of view of the camera 520e. The field of view of the camera 520e includes persons 530c, 530d, and 530e. FIG. 5F depicts a field of view of the camera 520f. The field of view of the camera 520f includes persons 530c, 530d, and 530e. FIG. 5G depicts a field of view of the camera 520g. The field of view of the camera 520g includes persons 530c, 530d, and 530e. FIG. 5H depicts a field of view of the camera 520h. The field of view of the camera 520h includes persons 530c, 530d, and 530e. In some embodiments, the cameras 520a-520h may be divided into one or more groups. Data captured by cameras from each group may be separately processed and combined to determine the location of each person in the room. The images from all cameras 520a-520h may include metadata indicating a time of capture of the respective images.

The locations of the persons 530a-530e may be determined based on the images collected by the cameras 520a-520h. The detected locations from the cameras 520a-520h, as shown in the FIGS. 5A-5I, may be shown as bounding boxes. Actual locations of persons in the automated-checkout store may be determined using known locations of the cameras 520a-520h, known directions and/or orientations of the cameras 520a-520h, and locations of the bounding boxes within the images. In some embodiments, the computer system may identify one or more pixels in an image that are associated with a person. Based on the location and orientation of the camera that captured the image, the computer system may determine one or more lines in three-dimensional space corresponding to the identified pixels. The computer system may determine that the determined lines passes through a space occupied by the person in three-dimensional space. Similarly, the computer system may identify one or more other lines in three-dimensional space that correspond to pixels associated with the person in one or more other images captured by other cameras. The computer system may then determine a portion of three-dimensional space where the lines intersect and identify the portion as the location of the person. As an example and not by way of limitation, the computer system may identify a plurality of pixels associated with the person 530a in FIGS. 5A, 5B, 5C, and 5D. Based on the location and orientation of each of the cameras 520a, 520b, 520c, and 520d, the computer system construct a model in three-dimensional space representing the location of the person 530a in the room shown in the images.

Figure 6:
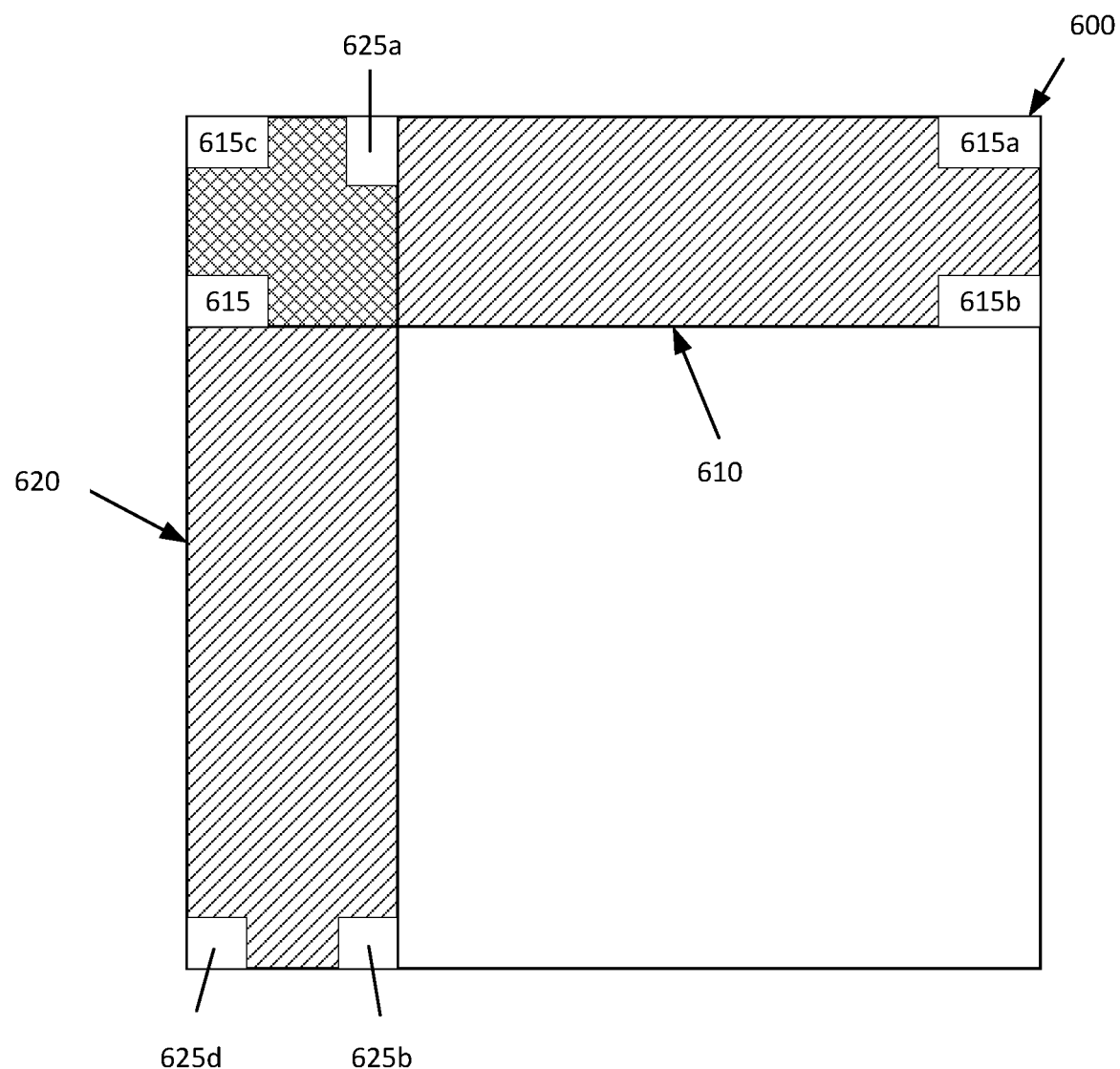
FIG. 6 illustrates an example setup for detecting persons using image sensors.

FIG. 6 illustrates an example setup 600 for detecting persons using image sensors. The setup 600 may be implemented as part of sensor system 400, and/or implemented as part of, controlled, or coordinated by a computer system, which may be implemented, for example, as system 300. In FIG. 6, cameras 615, 615a, 615b, and 615c may be placed at four corners of first region 610. In some embodiments, the cameras 615, 615a, 615b, and 615c represent a first customer tracking and monitoring module. Cameras 625a, 625b, and 625d may be placed at four corners of second region 620. In some embodiments, cameras 625a, 625b, and 625d represent a second customer tracking and monitoring module. The first region 610 and the second region 620 may comprise an overlapping region or field of view defined by a box enclosed by cameras 615c, 615, and 625a. The overlapping region may be monitored by both the first customer tracking and monitoring module and the second customer tracking and monitoring module. The first customer tracking and monitoring module and the second customer tracking and monitoring module may include a processor such as a central processing unit (CPU) or a graphics processing unit (GPU) for each of the image sensors. In some embodiments, each customer tracking and monitoring module may include one GPU which process digital images and videos captured by the image sensors within the customer tracking and monitoring module. In various embodiments, all of the digital images and video captured by the image sensors in the retail store may be processed by one central GPU for the entire retail store.

Each of the plurality of customer tracking and monitoring modules may be responsible for tracking and monitoring customers within the area of the retail store covered by each of the plurality of customer tracking and monitoring module. For example, at time t1, a particular customer reaches the overlap area. The first customer tracking and monitoring module and the second customer tracking and monitoring module may be configured to calculate and analyze data of that particular customer up to the time t1 to determine probabilities of the location of the particular customer and presenting a location of highest probability of the particular customer. A central processing unit may be configured to receive the location of highest probability of the particular customer from the first customer tracking and monitoring module and the second customer tracking and monitoring module and determine the probable location of that particular customer.

Small deep learning models can be used to run real time on edge device to detect and track people in each module region. Features such as body, facial, and location collected with RGB cameras can be used to track and identify people. The collected signals can be integrated to obtain tracking results from each region by concatenating overlapping areas and optimize from the entire store perspective. Data of people trajectory and body keypoints can also be collected for video analysis to help optimize store layouts and personalized product recommendation. Global optimization can be performed to integrate data from different modules. For example, a total number of people in the store can be detected by monitoring how many people enter through the door. The total number of people in the store can be used in global optimization. For example, if two modules have disagreements on two people images within close proximity, if the two images are counted as two people, the total number of people in store may be more than the total number entering the store counted by the system. In that case, the global optimization can be performed to count those two images as one person.

Figure 7:
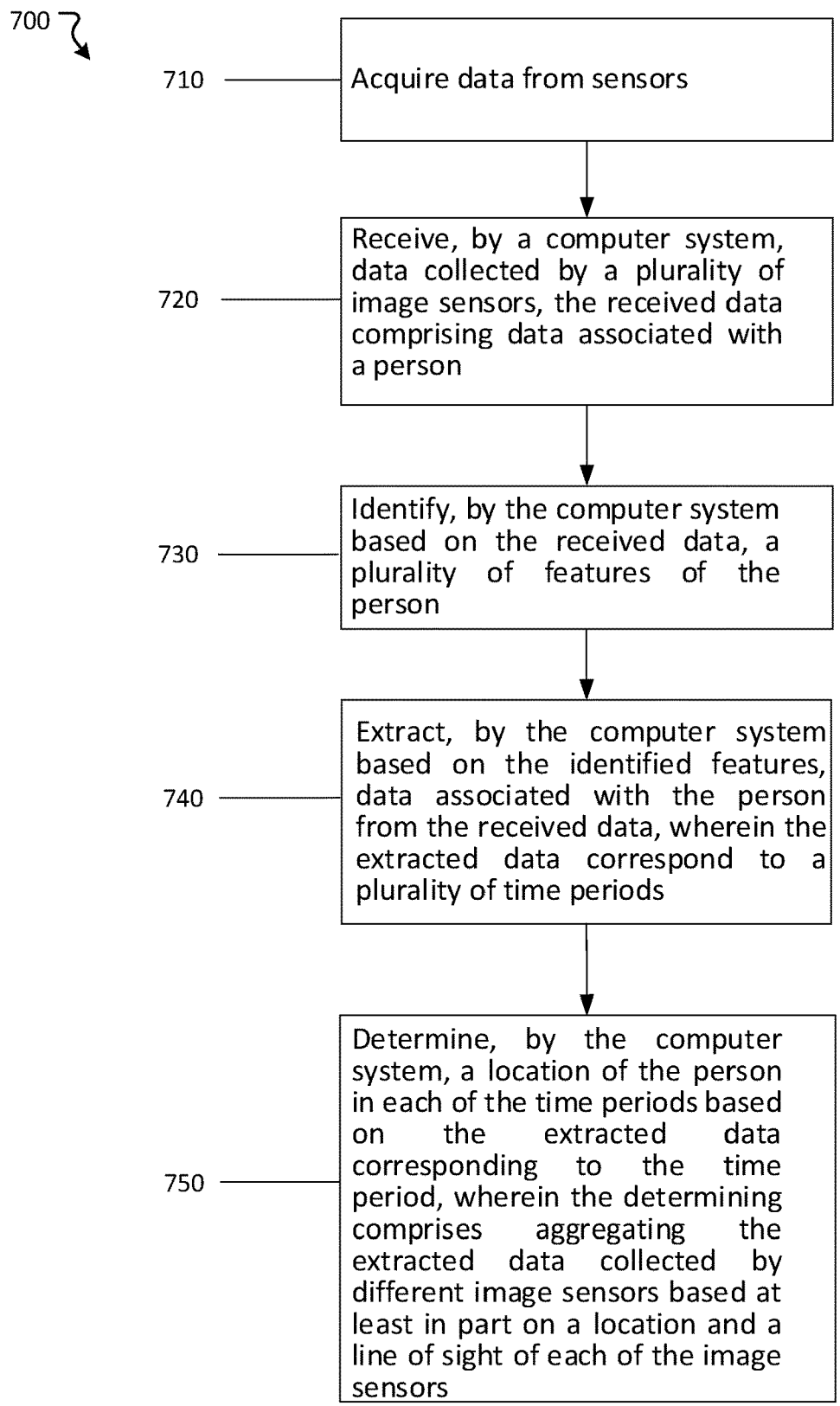
FIG. 7 illustrates an example method of detecting persons using sensors in an automated-checkout store.

FIG. 7 illustrates an example method 700 of detecting persons using sensors in an automated-checkout store. In this and other flowcharts, the flowchart 700 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 7. The method of FIG. 7 may be implemented, for example, by a computer system.

In step 710, a computer system may acquire data from sensors comprising image sensors (e.g., sensors 211, 212, 213, 221, 231, and/or 241). In step 720, the computer system may receive data collected by a plurality of image sensors. The received data may comprise data of or associated with a person. In step 730, the computer system may identify, based on the received data, a plurality of features of the person. In step 740, the computer system may extract, based on the identified plurality of features, data associated with the person from the received data. The extracted data may correspond to a plurality of time periods. In step 750, the computer system may determine a location of the person in each of the time periods based on the extracted data corresponding to the time period, wherein the determining comprises aggregating the extracted data collected by different image sensors based at least in part on a location and a line of sight of each of the image sensors.

Figure 8:
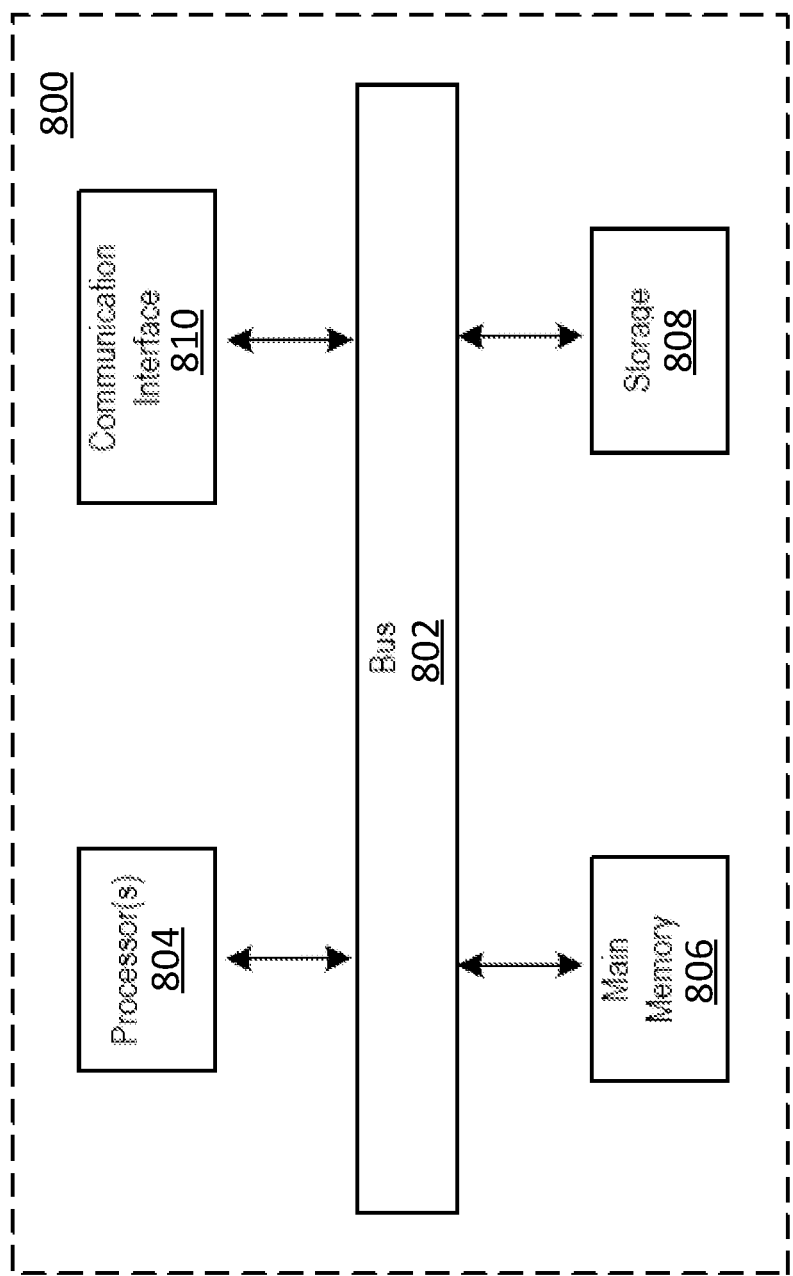
FIG. 8 illustrates an example electronic device.

FIG. 8 illustrates an example electronic device. The electronic device 800 may comprise a bus 802 or other communication mechanism for communicating information and one or more hardware processors 804 coupled with bus 802 for processing information. Hardware processor(s) 804 may be, for example, one or more general purpose microprocessors.

The electronic device 800 may also include a main memory 806, such as a random access memory (RAM), cache and/or other dynamic storage devices, coupled to bus 802 for storing information and instructions to be executed by processor(s) 804. Main memory 806 also may be used for storing temporary variables or other intermediate information during execution of instructions to be executed by processor(s) 804. Such instructions, when stored in storage media accessible to processor(s) 804, may render electronic device 800 into a special-purpose machine that is customized to perform the operations specified in the instructions. Main memory 806 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The electronic device 800 may implement the techniques described herein using customized hard-wired logic, one or more ASICs or FPGAs, firmware and/or program logic which in combination with the electronic device may cause or program electronic device 800 to be a special-purpose machine. According to one embodiment, the techniques herein are performed by electronic device 800 in response to processor(s) 804 executing one or more sequences of one or more instructions contained in main memory 806. Such instructions may be read into main memory 806 from another storage medium, such as storage device 808. Execution of the sequences of instructions contained in main memory 806 may cause processor(s) 804 to perform the process steps described herein. For example, the processes/methods disclosed herein may be implemented by computer program instructions stored in main memory 806. When these instructions are executed by processor(s) 804, they may perform the steps as shown in corresponding figures and described above. In alternative embodiments, hard-wired circuitry may be used in place of or in combination with software instructions.

The electronic device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A person-tracking method, comprising:
receiving, by a computer system, image data collected by a plurality of image sensors, the received image data comprising data associated with a person in an automated-checkout store;
receiving, by the computer system, vibration data collected by one or more vibration sensors located below a floor of the automated-checkout store, wherein the vibration data is generated in response to footsteps on the floor;
identifying, by the computer system based on the received image data, a plurality of features of the person;
extracting, by the computer system based on the identified features, data associated with the person from the received image data, wherein the extracted data correspond to a plurality of time periods; and
determining, by the computer system, a location of the person in the automated-checkout store in each of the time periods based on the extracted data corresponding to the time period and the vibration data, wherein the determining comprises aggregating the extracted data collected by different image sensors based at least in part on a location and a line of sight of each of the image sensors, and combining the extracted data with the vibration data.

2. The method of claim 1, wherein the identifying comprises:
assigning an identifier to the person; and
storing the features of the person in association with the identifier.

3. The method of claim 1, wherein the extracting comprises:
for one of the time periods, determining a location of the person in a preceding time period;
identifying one or more of the image sensors each having a field of view that encompasses the determined location; and
obtaining data collected by the identified image sensors that correspond to the time period.

4. The method of claim 3, further comprising:
determining a movement path of the person based on the location of the person in each of the time periods;
determining that the person exits the field of view of one or more of the identified image sensors and enters the field of view of one or more other image sensors; and
determining a location of the person in a subsequent time period based at least in part on data collected by the one or more other image sensors.

5. The method of claim 1, further comprising:
for one of the time periods, detecting a failure of locating the person in a preceding time period;
extracting data associated with the person from the received image data that correspond to the one of the time periods based on the identified features of the person;
identifying one or more of the image sensors that collected the extracted data; and
determining the location of the person based on data collected by the identified image sensors.

6. The method of claim 1, wherein the extracted data comprises a plurality of images captured by the image sensors, and wherein the aggregating the extracted data comprises:
identifying one or more pixels corresponding to the person in each of the images;
determining a plurality of lines in a three-dimensional space, wherein teach of the lines is determined based on a position of one of the identified pixels in the image containing the pixel and the line of sight of the image sensor capturing the image; and
determining one or more intersection areas of the lines.

7. The method of claim 1, further comprising:
processing the image data collected by each group of image sensors to obtain analysis results; and
aggregating the analysis results associated with the plurality of groups of image sensors.

8. The method of claim 1, wherein the determining the location of the person in each of the time periods further comprises:
determining a plurality of possible locations of the person each being associated with a probability value; and
selecting one of the possible locations as the location of the person based at least in part on the probability values.

9. The method of claim 1, wherein the determining the location of the person in each of the time periods further comprises:
determining a plurality of possible locations of the person; and selecting one of the possible locations as the location of the person based at least in part on a previous movement path of the person.

10. The method of claim 1, further comprising:
receiving, by the computer system, weight data collected by one or more weight sensors located below the floor of the automated-checkout store, wherein the weight data is generated in response to footsteps on the floor, and the determining, by the computer system, the location of the person in the automated-checkout store in each of the time periods further comprises:
determining, by the computer system, the location of the person in the automated-checkout store in each of the time periods based on the extracted data corresponding to the time period, the vibration data, and the weight data, and
combining the extracted data with the vibration data and the weight data.

11. The method of claim 1, further comprising:
receiving, by the computer system, electrical data collected by one or more piezo film sensors located in the floor of the automated-checkout store, wherein the electrical data is generated in response to footsteps on the floor, and the determining, by the computer system, the location of the person in the automated-checkout store in each of the time periods further comprises:
determining, by the computer system, the location of the person in the automated-checkout store in each of the time periods based on the extracted data corresponding to the time period, the vibration data, and the electrical data, and
combining the extracted data with the vibration data and the electrical data.

12. A system for tracking a person in an automated-checkout store comprising a computer system, one or more vibration sensors, and a plurality of image sensors, the computer system comprising one or more processors and one or more non-transitory computer-readable storage media storing instructions executable by the one or more processors to cause the system to perform operations comprising:
receiving, by the computer system, image data collected by the image sensors, the received image data comprising data associated with a person in the automated-checkout store;
receiving, by the computer system, vibration data collected by the one or more vibration sensors located below a floor of the automated-checkout store, wherein the vibration data is generated in response to footsteps on the floor;
identifying, by the computer system based on the received image data, a plurality of features of the person;
extracting, by the computer system based on the identified features, data associated with the person from the received image data, wherein the extracted data correspond to a plurality of time periods; and
determining, by the computer system, a location of the person in the automated-checkout store in each of the time periods based on the extracted data corresponding to the time period and the vibration data, wherein the determining comprises aggregating the extracted data collected by different image sensors based at least in part on a location and a line of sight of each of the image sensors, and combining the extracted data with the vibration data.

13. The system of claim 12, wherein the identifying, by the computer system based on the received image data, a plurality of features of the person, comprises:

assigning an identifier to the person; and
storing the plurality of features of the person in association with the identifier.

14. The system of claim 12, wherein the extracting, by the computer system based on the identified features, comprises:
for one of the time periods, determining a location of the person in a preceding time period;
identifying one or more of the image sensors each having a field of view that encompasses the determined location; and
obtaining data collected by the identified image sensors that correspond to the time period.

15. The system of claim 14, wherein the operations further comprise:
determining a movement path of the person based on the location of the person in each of the time periods;
determining that the person exits the field of view of one or more of the identified image sensors and enters the field of view of one or more other image sensors; and
determining a location of the person in a subsequent time period based at least in part on data collected by the one or more other image sensors.

16. The system of claim 12, wherein the operations further comprise:
for one of the time periods, detecting a failure of locating the person in a preceding time period;
extracting data associated with the person from the received image data that correspond to the one of the time periods based on the identified features of the person;
identifying one or more of the image sensors that collected the extracted data; and
determining the location of the person based on data collected by the identified image sensors.

17. The system of claim 12, wherein the extracted data comprises a plurality of images captured by the image sensors, and wherein the aggregating the extracted data comprises:
identifying one or more pixels corresponding to the person in each of the images;
determining a plurality of lines in a three-dimensional space, wherein teach of the lines is determined based on a position of one of the identified pixels in the image containing the pixel and the line of sight of the image sensor capturing the image; and
determining one or more intersection areas of the lines.

18. The system of claim 12, wherein the plurality of image sensors correspond to a plurality of groups each comprising one or more of the image sensors, and wherein the aggregating the extracted data comprises:
processing the image data collected by each group of image sensors to obtain analysis results; and
aggregating the analysis results associated with the plurality of groups of image sensors.

19. The system of claim 12, wherein the determining the location of the person in each of the time periods further comprises:
determining a plurality of possible locations of the person each being associated with a probability value; and
selecting one of the possible locations as the location of the person based at least in part on the probability values.

20. The system of claim 12, wherein the determining the location of the person in each of the time periods further comprises:
determining a plurality of possible locations of the person; and selecting one of the possible locations as the location of the person based at least in part on a previous movement path of the person.

\* \* \* \* \*

UNITED STATES PATENT AND TRADEMARK OFFICE
CERTIFICATE OF CORRECTION

PATENT NO. : 11,393,213 B2
APPLICATION NO. : 16/508678
DATED : July 19, 2022
INVENTOR(S) : Shuang Liu et al.

Page 1 of 1

It is certified that error appears in the above-identified patent and that said Letters Patent is hereby corrected as shown below:

In the Claims

Claim 6, Column 28, Line 45:
"space, wherein teach of the lines is determined based on" should read -- space, wherein each of the lines is determined based on --.

Claim 17, Column 30, Line 42:
"space, wherein teach of the lines is determined based on" should read -- space, wherein each of the lines is determined based on --.

Signed and Sealed this
Eleventh Day of July, 2023

Katherine Kelly Vidal
*Director of the United States Patent and Trademark Office*